United States Patent
Dennis

(10) Patent No.: US 10,305,833 B1
(45) Date of Patent: May 28, 2019

(54) BLOCKCHAIN BASED EMAIL PROCEDURES

(71) Applicant: Turing Technology, Inc., Redwood City, CA (US)

(72) Inventor: Stewart MacGregor Dennis, Redwood City, CA (US)

(73) Assignee: TURING TECHNOLOGY, INC., Redwood City, CA (US)

( * ) Notice: Subject to any disclaimer, the term of this patent is extended or adjusted under 35 U.S.C. 154(b) by 104 days.

(21) Appl. No.: 15/723,467

(22) Filed: Oct. 3, 2017

Related U.S. Application Data

(60) Provisional application No. 62/535,910, filed on Jul. 23, 2017.

(51) Int. Cl.
*H04L 29/06* (2006.01)
*H04L 12/58* (2006.01)
*H04L 9/16* (2006.01)
*H04L 9/30* (2006.01)

(52) U.S. Cl.
CPC .............. *H04L 51/12* (2013.01); *H04L 9/16* (2013.01); *H04L 9/30* (2013.01); *H04L 63/205* (2013.01)

(58) Field of Classification Search
CPC .................................................. H04L 63/205
USPC ........................................................ 726/22
See application file for complete search history.

(56) References Cited

U.S. PATENT DOCUMENTS

| | | | |
|---|---|---|---|
| 7,783,883 B2 | 8/2010 | Gasparini et al. | |
| 2018/0053160 A1* | 2/2018 | Schwartz | G06Q 20/389 |
| 2018/0053161 A1* | 2/2018 | Bordash | G06Q 20/102 |
| 2018/0374094 A1* | 12/2018 | Kohli | G06Q 20/401 |

OTHER PUBLICATIONS

Bouguila et al., "A discrete mixture-based kernal for SVMs: Application to spam and image categorization," Information Processing & Management, vol. 45, Issue 6, Nov. 2009, pp. 631-642.
Boykin et al., "Leveraging Social Networks to Fight Spam," IEEE, Apr. 2005, 8 pages.
Crispin, M., "Internet Message Access Protocol," version 4rev1, Mar. 2003, 108 pages.
Fdez-Riverola et al., "SpamHunting: An Instance-Based Reasoning System for Spam Labelling and Filtering," Decision Support Systems v43, Issue 3, Apr. 2007, 34 pages.
Klensin, "RFC 5321—Simple Mail Transfer Protocol," Oct. 2008, 83 pages.

(Continued)

*Primary Examiner* — Longbit Chai
(74) *Attorney, Agent, or Firm* — Haynes Beffel & Wolfeld LLP

(57) ABSTRACT

Systems and techniques are provided for managing and categorizing unsolicited emails from unknown senders using blockchain technology. In a specific implementation, an email authorization system authorizes emails from unknown senders to reach recipient email inboxes after the unknown senders validate the emails by executing blockchain transactions prompted by the email authorization system; else, the emails from unknown senders are not included in the recipient email inboxes. The blockchain transactions are recorded in a blockchain ledger in a blockchain network.

36 Claims, 17 Drawing Sheets

REGISTERED EMAIL ACCOUNT — 404

| EMAIL ACCOUNT ID (602) | USER ID (502) | EMAIL ACCOUNT ADDRESS (604) | EMAIL ACCOUNT TYPE (606) | OPTIONAL (608) |
|---|---|---|---|---|
| 101 | 1001 | JohnEMurphy@teleworm.us | OUTLOOK | |
| 102 | 1001 | JohnEMurphy@gmail.com | GMAIL | |
| 103 | 1002 | FernandoCCash@dayrep.com | OUTLOOK | |
| 104 | 1003 | jsmith@gmail.com | GMAIL | |
| 105 | 1004 | daniel@toprecruiters.com | GMAIL | |
| 106 | 1005 | CarlNBrewington@yahoo.com | YAHOO | |
| 107 | 1006 | brandon@rufus.com | imap.rufus.com:993;smtp.rufus.com:556 | |

(56) References Cited

OTHER PUBLICATIONS

Laurie et al., "'Proof-of-Work' Proves Not to Work," May 3, 2004, 9 pages.
Myers et al., "RFC 1939—Post Office Protocol," May 1996, 21 pages.
Salehi et al., "Enhanced genetic algorithm for spam detection in email," 2011 IEEE 2nd Int'l Conf. on Software Engineering and Service Science, Beijing, Jul. 15-17, 2011, pp. 594-597.
Salehi et al., "Hybrid simple artificial immune system (SAIS) and particle swarm optimization (PSO) for spam detection," 2011 Malaysian Conference in Software Engineering, Johor Bahru, Dec. 13-14, 2011, pp. 124-129.
Apeltsin, "A CryptoCubic Protocol for Hacker-Proof Off-Chain Bitcoin Transactions," Cornell University Library, arXiv:1408.2824, 16 pages, Aug 11, 2014.

\* cited by examiner

USER 402

| USER ID 502 | NAME 504 | EXPECTED TOKEN 506 | PRIVATE KEY FOR WALLET SERVICE 508 | OPTIONAL 510 |
|---|---|---|---|---|
| 1001 | John E. Murphy | 400 | [Private Key for John E. Murphy] | |
| 1002 | Fernando C. Cash | 250 | [Private Key for Fernando C. Cash] | |
| 1003 | Jonathon Smith | 10 | [Private Key for Jonathon Smith] | |
| 1004 | Kristine B. Odaniel | 100 | [Private Key for Kristine B. Odaniel] | |
| 1005 | Carl N. Brewington | 2000 | [Private Key for Carl N. Brewington] | |
| 1006 | Brandon R. Rufus | 5 | [Private Key for Brandon R. Rufus] | |

FIG. 5

REGISTERED EMAIL ACCOUNT 404

| EMAIL ACCOUNT ID 602 | USER ID 502 | EMAIL ACCOUNT ADDRESS 604 | EMAIL ACCOUNT TYPE 606 | OPTIONAL 608 |
|---|---|---|---|---|
| 101 | 1001 | JohnEMurphy@teleworm.us | OUTLOOK | |
| 102 | 1001 | JohnEMurphy@gmail.com | GMAIL | |
| 103 | 1002 | FernandoCCash@dayrep.com | OUTLOOK | |
| 104 | 1003 | jsmith@gmail.com | GMAIL | |
| 105 | 1004 | daniel@toprecruiters.com | GMAIL | |
| 106 | 1005 | CarlNBrewington@yahoo.com | YAHOO | |
| 107 | 1006 | brandon@rufus.com | imap.rufus.com:993;smtp.rufus.com:556 | |

FIG. 6

FILTER — 406

| USER ID 502 | ALLOWED ADDRESS 702 |
|---|---|
| 1001 | ProfDolittle@cs.umn.edu |
| 1001 | bitbounce.io |
| 1002 | RichardMDavis@rhyta.com |
| 1004 | EliseJWeber@jourrapide.com |
| 1004 | Mary.Smith@smiths.com |
| 1004 | yahoo.com |
| 1004 | marysu@franklinhamilton.com |
| 1006 | roofy.com |

OPTIONAL — 704

FIG. 7

UNAUTHORIZED EMAIL

| EMAIL ID | SUBJECT | EMAIL ACCOUNT ID | SENDER ADDRESS | CURRENT FOLDER | TOKEN RECEIVED? | OPTIONAL |
|---|---|---|---|---|---|---|
| 1 | GET PAID $500/hr | A101 | JohnKelly@yahoo.com | UNAUTHORIZED | FALSE | |
| 2 | Job recommendation | A105 | Mary.Smith@smiths.com | INBOX | TRUE | |
| 3 | *FREE VACATION* | A101 | goodlife@gmail.com | UNAUTHORIZED | FALSE | |
| 4 | Invitation to join ACM Artificial Intelligence Committee | A106 | ProfDolittle@cs.umn.edu | INBOX | TRUE | |

FIG. 8

BLOCKCHAIN ADDRESS FOR UNAUTHORIZED EMAIL

| EMAIL ID | EMAIL BLOCKCHAIN ADDRESS | TRANSACTION MADE? | OPTIONAL |
|---|---|---|---|
| 1 | N0zmDwVrWc | FALSE | |
| 2 | sFIpgWjUYq | TRUE | |
| 3 | zxmaF18M4I | FALSE | |
| 4 | 2zblUwBTmv | TRUE | |

| EMAIL BLOCKCHAIN ADDRESS | TIMESTAMP | TOKEN RECEIVED |
|---|---|---|
| 2zbIUwBTmv | 2017-09-12T22:56:33+00:00 | 2000 |

FIG. 18B

BLOCKCHAIN BASED EMAIL PROCEDURES

PRIORITY APPLICATION

This application claims the benefit of U.S. Provisional Patent Application No. 62/535,910, filed 23 Jul. 2017; which application is incorporated herein by reference.

BACKGROUND

Field

The present invention relates to authorization of emails from unknown senders. More particularly, the present invention relates to authorizing emails from unknown senders to be delivered to the recipients using blockchain technology.

Description of Related Art

Electronic mail (email) is a fast and powerful tool for information exchange between individuals and organizations. Due to email's immense popularity, low cost and fast delivery characteristics, the technology is prone to be misused. In the recent years, a vast majority of the email traffic could be considered spam. Spammers create and exploit free webmail accounts, and send spam emails directly to victims' mailboxes by exploiting the computational power and network bandwidth of their hosts. Spam emails are also used to spread threats, including malicious software (e.g., internet worms, Trojan horses, computer viruses and spyware) and phishing (i.e., attacks that seek to acquire sensitive information from spam email recipients). Spam emails are not only a nuisance for the email users but, additionally, cost billions of dollars in productivity losses.

Many spam filtering methods are used by email service providers and organizations. There are three main approaches for spam filtering: content-based filtering, real-time blacklisting, and sender reputation mechanisms. Content-based filtering refers to techniques in which the body of the email, attached executables, pictures or other files are analyzed and processed to determine whether the email can be classified as spam. Significant computational resources are wasted on the filtering process, thus making it fairly costly. Real-time blacklisting is another technique for mitigating spam by maintaining a "blacklist" of locations, or Internet Protocol (IP) addresses on the Internet reputed to send spam emails. Internet Service Providers (ISP) and email server software can be configured to reject or flag messages which have been sent from a site listed on one or more such blacklists. Although real-time blacklisting is a fast filtering process, it is not very effective as spammers can bypass the blacklists by repeatedly changing their IP addresses. Another shortcoming of real-time blacklisting is that whenever an IP prefix is blacklisted, both spammers and benign senders who share the same prefix might be rejected. Sender reputation mechanisms for spam email mitigation are a collection of methods for computing the reputation of email senders. The computation is usually based on information extracted from the network, the transport level, social network information or other useful identifiers. When a sending pattern of a sender reflects that of a spammer, his reputation typically decreases. If the reputation of a sender goes below a predefined threshold, the system typically rejects the sender's emails, at least until he gains up some reputation, by changing his sending properties. Various Machine learning algorithms for computing sender reputation from data sets include Bayesian classifier (P. Boykin et al., Leveraging Social Networks to fight Spam, IEEE Computer, 38(4), pp. 61-68, 2005), support vector machine-based classifier (N. Bouguila et al., A discrete mixture-based kernel for SVMs: application to spam and image categorization, Information Processing & Management, 45, pp. 631-642, 2009), genetic algorithm (S. Salehi et al., Enhanced genetic algorithm for spam detection in email, 2nd IEEE International Conference on Software Engineering and Service Science, pp. 594-597, 2011), artificial immune system (S. Salehi and A. Selamat, Hybrid simple artificial immune system (SAIS) and particle swarm optimization (PSO) for spam detection, 5th IEEE Malaysian Conference on Software Engineering (MySEC), pp. 124-129, 2011), and case-based technique (F. Fdez-Riverola et al., SpamHunting: An instance-based reasoning system for spam labeling and filtering, Decision Support Systems, 43, pp. 722-736, 2007).

Apart from spam emails, email users may also receive another form of unsolicited emails from unknown recipients known as "cold" emails. A cold email is an email that is sent to a recipient without sufficient prior contact between the sender and the recipient. Examples of cold emails include emails from job seekers to potential employers, from entrepreneurs to investors, from salespeople to corporate executives and customers for potential business opportunities, from recruiters to potential job candidates, and so on. While cold emails can be sent with good intentions from genuine senders (e.g., a job seeker sending a well-written email to one potential employer), in some instances the sender can be considered a borderline spammer (e.g., a fresh college graduate sending a generic email inquiring about available positions to twenty potential employers). Communicating to target recipients via cold emails is somewhat risky for cold email senders as there is no guarantee that the target recipient will respond to the email reliably. The target recipients of cold emails may feel that responding to some or all cold emails received may not be the best usage of their valuable time. The target recipient will benefit from a cold email filtering system that filters cold emails to include ones from only serious and genuine senders in his inbox. Genuine senders of cold emails will benefit from some sort of confirmation that the target recipients have received their cold emails and may respond in the near future.

It is desirable to provide an email exchange solution that can more effectively filter out both spam emails and non-genuine cold emails.

SUMMARY

A system and a method are provided that can be used for filtering out spam and non-genuine cold emails. In a method described herein, emails in a recipient email channel are selected using filters, for example, where the filters may apply algorithms to select emails that are not part of an established list associated with the recipient or other processes that can classify incoming emails. The selected emails are tagged as not authorized, and can in some cases be blocked from delivery to the recipient's email inbox, or removed from the recipient's email inbox. For a particular selected email, an individual blockchain address is created, and a message is sent to the sender of the particular selected email, prompting execution of a blockchain transaction associated with the individual blockchain address of the particular filtered email. A sender of a genuine cold email may validate the particular selected email by executing the blockchain transaction associated with the individual blockchain address of the particular filtered email. The blockchain transaction will be recorded in a blockchain ledger maintained by a blockchain network. The blockchain ledgers in the blockchain network are monitored to detect the completion of the prompted blockchain transaction. After the system detects and verifies a record for the prompted blockchain transaction in the blockchain network, the particular selected email from the sender can be classified as authorized, and in some cases can be moved from a message folder holding unauthorized emails to the recipient's email inbox.

In one embodiment, the blockchain transaction has specified characteristics, such as involving a transfer of a predetermined amount of cryptocurrency to the individual blockchain address associated with the email. Other types of blockchain transactions can be used as well, such as transfer of a specified cryptographic token, or proof of performance of an obligation set in a blockchain contract.

Embodiments of the technology described herein, or elements thereof, can be implemented in the form of a computer product including a non-transitory computer-readable storage medium with the computer usable program code for performing the method steps indicated. Furthermore, embodiments of the invention or elements thereof can be implemented in the form of an apparatus including a memory and at least one processor that is coupled to the memory and operative to perform exemplary method steps. Yet further, in another aspect, embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer-readable storage medium (or multiple such media).

Thus, a technology is provided that can replace or supplement spam filters known in the prior art. In use, the present technology can effectively block spam and cold email, while enabling senders of emails to gain authorization for delivery of emails when they are motivated to do so. As spammers and non-genuine cold emailers are unlikely to execute a blockchain transaction to gain authorization, in general only genuine cold emails and email from known contacts will be directed to the recipients' email inboxes.

These and other features, aspects, and advantages of the invention will become apparent from the following detailed description of illustrative embodiments thereof, which is to be read in connection with the accompanying drawings.

BRIEF DESCRIPTION OF THE DRAWINGS

FIG. 5 is a symbolic drawing indicating how the user database in FIG. 4 is organized, according to an embodiment of the invention.

FIG. 6 is a symbolic drawing indicating how the registered email account database in FIG. 4 is organized, according to an embodiment of the invention.

FIG. 7 is a symbolic drawing indicating how the filter database in FIG. 4 is organized, according to an embodiment of the invention FIG. 8 is a symbolic drawing indicating how the unauthorized email database in FIG. 4 is organized, according to an embodiment of the invention.

FIG. 9 is a symbolic drawing indicating how the blockchain addresses for the unauthorized database in FIG. 4 is organized, according to an embodiment of the invention.

FIGS. 18A and 18B (hereafter FIG. 18) illustrate an example blockchain ledger data structure in a blockchain network that implements the technology disclosed.

DETAILED DESCRIPTION

Figure 1:
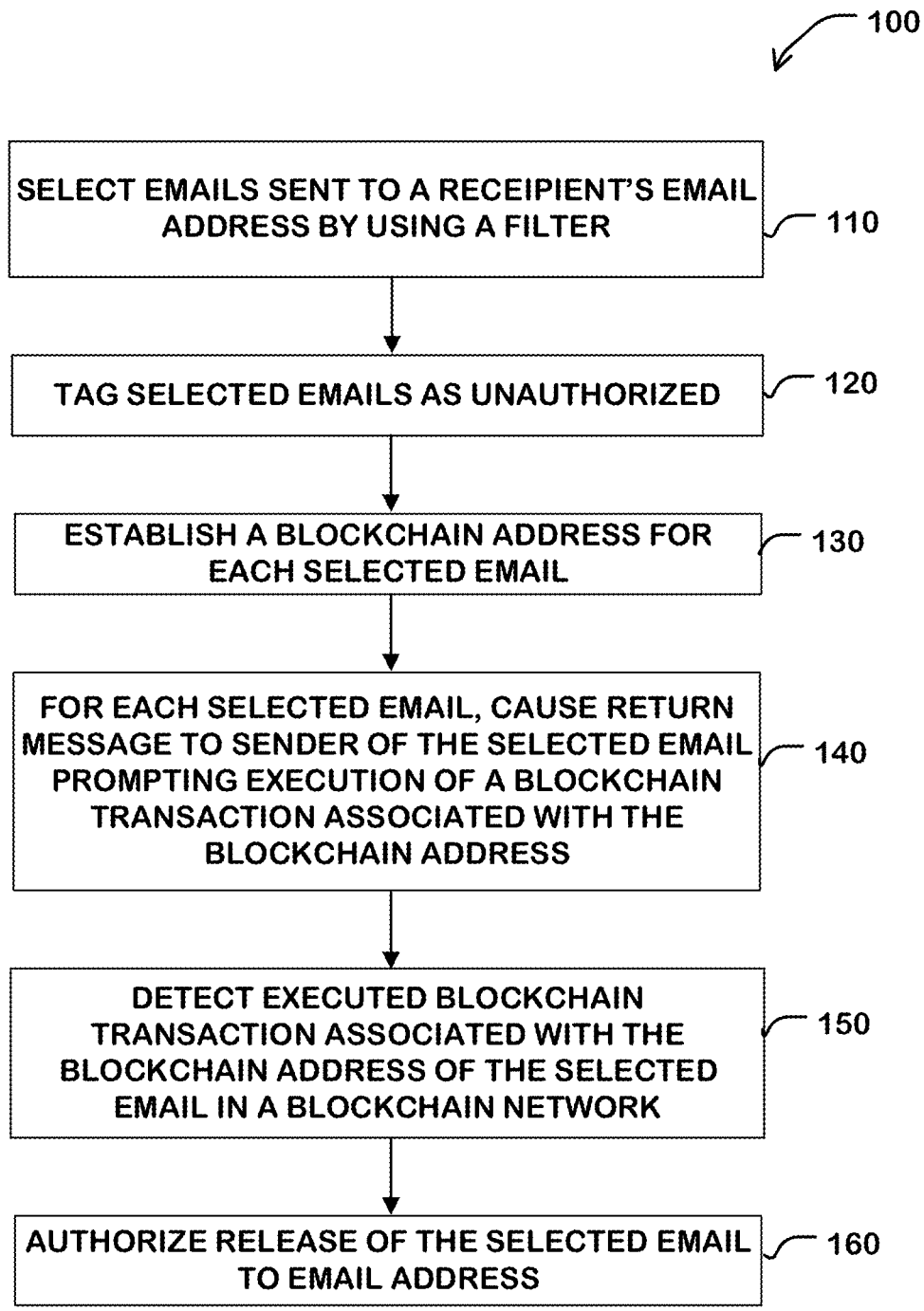
FIG. 1 illustrates the process flow of an email authorization system.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

Email, short for Electronic Mail, is a method of exchanging messages between people using electronics. Email operates across computer networks, which today is primarily the Internet. Email messages consist of two major sections, the message header, and the message body, collectively known as content. The header is structured into fields such as From (specifying the sender), To (specifying one or more recipients), Subject, Date, and other information about the email. The body contains the message as unstructured text. In addition to the message body, images, multimedia or documents can also be attached to emails.

An email server is a computer processor that serves as an electronic post office for emails. Emails exchanged across networks is passed between email servers. Email servers can run an email server software which is built around agreed-upon, standardized protocols for handling emails. An example of such a protocol is Simple Mail Transfer Protocol (SMTP). Various computer software that can be used to run an email server includes Novell Groupwise™, Lotus Notes™, Microsoft Exchange Servers™, Sendmail™, Postfix™, and Exim™. An email server can also run as a web-based email platform, such as Gmail™, Hotmail™, or Yahoo! Mail™. Most email server systems are based on a store-and-forward model where email servers accept, forward, deliver, and store messages for email users. Neither the users nor their email receiving devices are required to be online continuously to receive or send emails; they need to connect only briefly for as long as it takes to send or receive messages. In the process of transporting email messages between email servers, SMTP communicates delivery parameters and information using email message header fields.

In order to send or receive emails, an email user can use an email account on an email server. An email address identifies an email account to which email messages to the user are delivered. The general format of an email address is local-part@domain, and a specific example is jsmith@example.com. The part before the @ symbol (local-part) identifies the name of the email account. This is often the username of the recipient, e.g., j smith. The part after the @ symbol (domain) is a domain name that represents the administrative realm for the email account, e.g., an email server's domain name, example.com. A single email account may receive emails from multiple email addresses. Email channels are, for the purposes of this disclosure, a communication link on which emails in the system of email servers are transported among email servers and email clients. A recipient email channel can include a number of nodes, including an email client associated with the recipient email address, and email servers acting as email transfer agents in the network for the recipient email address. An "inbox" is used herein to refer to a mailbox folder for the recipient email address designated to act as a delivery point for newly-delivered emails in an email channel. In a typical email client, incoming emails from the email channel or channels serving the email client are placed in an inbox, and can be presented as inbox emails on a user interface on the platform in use by the email client. A client may have more than one message folder acting as inboxes, and sets of rules in place to direct emails to particular message folders.

In addition to sending and receiving emails, an email user can also maintain a "contact list" to store email addresses and other contact information of known contacts. In some embodiments, email domains and Internet Protocol (IP) addresses can also be stored in an email user's contact list. Such contact lists are typically deployed to assist composition of emails to be sent, and to provide information associated with the senders of emails that have been delivered to the email client.

In some embodiments, the email authorization system can be used in conjunction with one or more spam filtering methods.

FIG. 1 illustrates the process flow 100 of an email authorization system that processes emails in an email channel to a recipient email. In some embodiments, the actions in the process flow may be performed in different orders and/or with different, fewer or additional actions than those illustrated in FIG. 1. Multiple actions can be combined in some implementations.

The email authorization system begins at step 110 by selecting emails from an email channel to a recipient's email address using a classification procedure, such as a filter. The email channel may be monitored for new emails, such as by periodically polling a message folder in the email channel at an email client, or by configuring the email channel to forward new emails to a designated message folder used by the classification procedure. In some embodiments, the monitoring of the email channel includes periodically accessing the email recipient's primary inbox to identify new emails. In other embodiments, the monitoring of the email channel can include accessing a message folder other than the primary inbox, through which incoming emails may be buffered in the email channel before delivery to the primary inbox. The email authorization system includes a procedure that traverses email inbox folders, or other points in an email channel, of registered email addresses in some embodiments, removing particular selected emails from the email inbox folders (or other point), and saving the particular selected emails in a folder or folders for unauthorized emails for the registered email accounts. The email authorization system selects emails for processing by applying the classification procedure to emails in email channels of registered email accounts A filter to be used for classification of incoming emails can be composed using identifying parameters associated with emails. Emails classified, using the filter or other procedure, as unauthorized can be tagged so that the email client is notified of the unauthorized status, or so that the unauthorized email can be moved into a message folder designated for unauthorized emails, and out of the inbox.

The identifying parameters used in a filter can include for example components in an email message header, e.g., sender email address, email address domain, IP address from which the email originated, etc. In some embodiments, the recipient's contact list can be used to populate the filter applied for email to that recipient. A filter based on known contacts can be referred to as a "whitelist" filter, as opposed to a "blacklist" filter in which the filter is based on known or suspected spam emails. For an example of a whitelist, if an email address of the sender, domain of the email address, or IP address from which the email originated, includes an identifying parameter set in the filter based on a contact list, the email is not selected. If the email does not include an identifying parameter set in the filter based on the known contact list, such as one of the addresses of the sender, the domain of the email address, or IP address from which the email originated, the email is selected by the email authorization system as an unauthorized email. Any email not selected by the email authorization system may be classified as authorized, and moved into, or left in, the recipient's inbox, or otherwise identified as an authorized email.

Process flow 100 continues at step 120 where the email authorization system tags the selected emails as being unauthorized. As described herein, "tagging" an email indicates the email authorization system classified the email as unauthorized, and can comprise setting a parameter associated with the selected email enabling it to be marked in a user interface as unauthorized. Also, tagging the emails can include causing it to be removed from the inbox or other message folder at the recipient client, and causing it to be stored in a message folder designated for unauthorized emails and other actions related to storage of the email. In some embodiments, a tagged email is moved to a secondary folder in the recipient's email account, such as an "unauthorized" folder. As described herein, an "unauthorized" folder is a folder in the email account that stores tagged emails that have not been authorized by the email authorization system to be included in the recipient's email inbox.

In some embodiments, the selected email may initially be placed in the inbox folder and then removed from the recipient's inbox after being tagged by the email authorization system. In some embodiments, the email authorization system may apply the filter to, and tag, an email in the email channel before the email reaches the recipient's inbox and redirect the tagged email to a location other than the recipient's inbox.

Referring to FIG. 1, at step 130, the email authorization system establishes a blockchain address for the selected emails. In some embodiments, the blockchain address is randomly generated using a public key associated with a private key that is used to encrypt transactions associated with the address. The public key/private key pair can be produced using public key cryptography. Public key cryptography uses pairs of keys: (i) public keys which may be disseminated widely, and (ii) private keys which are known only to the owner of the key. Public key cryptography accomplishes two functions: authentication, which is when the public key can be used to verify that a holder of the paired private key sent the message, and encryption, whereby only the holder of the paired private key can decrypt the message encrypted with the public key. In a public key cryptography system, any person can encrypt a message using the public key of the receiver, but such a message can be decrypted only with the receiver's private key.

In one embodiment, the private key used to produce the blockchain address of particular selected emails of an email recipient is generated and stored in a digital "wallet" of the email recipient. A digital wallet is a software program that maintains blockchain addresses and private keys held by the account holders, and supports the execution of blockchain transactions by which users send or receive cryptocurrency, pay for goods or save cryptocurrency.

Cryptocurrency is a digital asset designed to work as a medium of exchange to secure transactions between two parties using cryptography. Numerous digital wallets exist today such as Coinbase™, Bread Wallet™, Mycelium™, Exodus™ Copay™, Jaxx™, Armory™, Trezor™, Ledger Nano™, Green Address™ and Blockchain.Info™. In some embodiments, the email authorization system may host its own digital wallet.

Referring to FIG. 1, at step 140, the email authorization system causes a message to be composed and sent to the sender of a particular selected email, prompting the sender to validate the selected email by executing a blockchain transaction associated with the blockchain address created for the selected email. The message can include links or software to facilitate or enable the execution of a blockchain transaction having specified characteristics.

In one embodiment, the blockchain transaction involves causing the blockchain network to add a record in the blockchain ledger that includes the specified characteristics required for authorization of the selected emails, such as a transfer of a predetermined type of token from the sender of the selected email to the recipient, transfer of a specified amount of cryptocurrency, or performance of a condition or obligation of a blockchain contract. On completion of the blockchain transaction, a party monitoring the blockchain network will be able to detect the completion of the blockchain transaction. As described herein, "token" is a means to enable the authorization of an email, selected and tagged by the email authorization system, for its intended recipient's inbox. In one embodiment, cryptocurrencies can be used as a form of token. Numerous cryptocurrencies exist today such as Bitcoin™, Ethereum™, Credo™ Bitcoin Cash™, Ripple™, Litecoin™, Dash™, Peercoin™, Namecoin™, Dogecoin™ Primecoin™, and Mastercoin™. For techniques described herein, any form of cryptocurrency can be used as tokens to execute a blockchain transaction.

The sender validates the particular selected email by executing the blockchain transaction associated with the blockchain address created for the selected email, and the executed transaction is recorded in a blockchain ledger in a blockchain network. The blockchain transaction is broadcasted to a blockchain network, specifying the blockchain address and the characteristics of the transaction, such as an amount of cryptocurrency that has been transferred.

A blockchain network hosts multiple open, distributed blockchain ledgers that can record cryptocurrency transactions between two parties efficiently and in a verifiable and permanent way. The safety, integrity, and balance of all blockchain networks are ensured by a group of mutually distrustful parties, referred to by terms such as miners or stakers, who actively protect the network by maintaining a consensus algorithm. In some embodiments, the consensus algorithm may be the proof-of-stake algorithm (PoS). Other consensus algorithms that can be used for techniques described herein are the practical Byzantine fault tolerance algorithm (PBFT), the proof-of-work algorithm (PoW), the delegated proof-of-stake algorithm (DPoS), the proof-of-authority algorithm (PoA) and the proof-of-importance algorithm (PoI). Each time a blockchain transaction is broadcasted on the blockchain network, a "miner" processes the blockchain transaction to ensure that all the information in the blockchain transaction is correct and then updates the blockchain network. For a blockchain transaction to be confirmed, it must be included in a "block" along with a mathematical proof performed by the miner based on the consensus algorithm employed by the blockchain network. These proofs are very difficult to generate and are designed to depend on the previous block, making it exponentially difficult to reverse previous blockchain transactions. Validation (or confirmation) of a blockchain transaction in a blockchain network may require confirmations on the blockchain network, with each successive confirmation adding greater confidence that a blockchain transaction is valid. A confirmation means that there is a consensus on the network that, for example, cryptocurrency involved in the transaction has not been sent to anyone else and is the property of the email recipient.

Referring to FIG. 1, at step 150, the email authorization system maintains a list of unauthorized emails, and with information identifying the characteristics of the blockchain transaction prompted for each in the return emails. The email authorization server detects executed blockchain transactions in the blockchain ledgers in the blockchain network associated with the blockchain addresses of emails in the list of unauthorized emails. For detected transactions, the authorization server verifies that it matches the prompted transaction for an email tagged unauthorized. In one embodiment, detection of the blockchain transactions is accomplished by notification from a digital wallet service, which may notify the email authorization system of the completed execution of the blockchain transaction. In another embodiment, the email authorization server detects blockchain transactions by polling the blockchain for new blocks containing transactions for the blockchain addresses of the unauthorized emails. At step 160, the email authorization system authorizes the selected emails if the selected emails have been validated by a prompted blockchain transaction which has been confirmed as executed. The authorization can be executed by removing the unauthorized tag, by moving the email out of the unauthorized list into the recipient's email channel or inbox, or otherwise.

The process of FIG. 1 can be implemented using a computer system storing computer software for execution which has access to the email channels of registered users. The network node can be implemented on a machine coupled to the internet including, in some embodiments, the same machine as is used by email recipients, and in other embodiments, a cloud-based server, and in other embodiments, any point of presence on a network connected to the internet.

The computer software implementing the process of FIG. 1 can be stored in computer-readable memory, or other non-transitory data storage medium, for the purposes of distribution to machines to execute the procedures, or for access by a processor or processors executing the procedure.

System Overview

Figure 2:
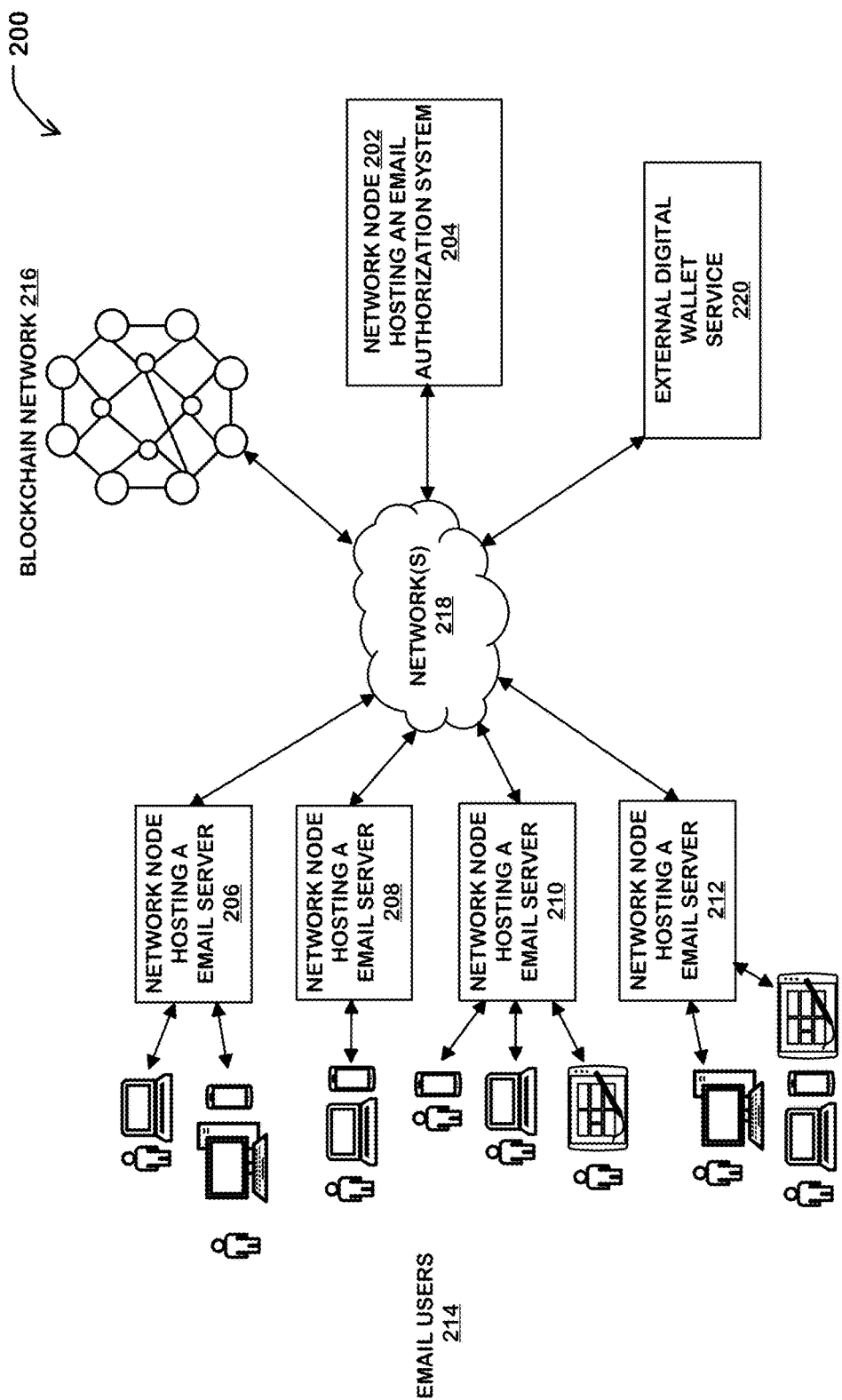
FIG. 2 illustrates an architectural level schematic of an environment that includes an email authorization system in accordance with an implementation.

FIG. 2 illustrates an architectural level schematic of an environment in which an email authorization system executing a procedure like that of FIG. 1, is deployed in a network node 202 on the network. Because FIG. 2 is an architectural diagram, certain details are intentionally omitted to improve the clarity of the description. The discussion of FIG. 2 will be organized as follows. First, the elements of the figure will be described, followed by their interconnections.

The system 200 includes network nodes hosting email servers 206, 208, 210 and 212, the network(s) 218, a blockchain network 216, an external wallet service 220, and a network node 202 hosting an email authorization system 204. As used herein, a network node is an active electronic device or virtual device that is attached to a network, and is capable of sending, receiving, or forwarding information over a communications channel. Examples of electronic devices which can be deployed as network nodes include all varieties of computers, workstations, laptop computers, handheld computers, and smartphones. Network nodes can be implemented in a cloud-based server system. More than one virtual device configured as a network node can be implemented using a single physical device. For the sake of clarity, only four network nodes hosting email servers and one external wallet service are shown to be connected to the network node 202 hosting an email authorization system 204 through the network(s) 218. However, any number of network nodes hosting email servers and external wallet services can be connected to the network node 202 hosting an email authorization system 204 through the network(s) 218.

The interconnection of the elements of system 200 will now be described. Network(s) 218 couples the network nodes hosting email servers 206, 208, 210 and 212, the blockchain network 216, the external wallet service 220, and the network node 202 hosting the email authorization system 204, all in communication with each other (indicated by solid double-arrowed lines). Email users 214 are connected to the network node 202 hosting the email authorization system 204 through network nodes hosting email servers 206, 208, 210 and 212. Each email user has an email account in their respective email server. In some embodiments, email users 214 may include one or more individuals who utilize the functionality of an email authorization system to reduce unsolicited emails in their email inboxes. Various computer software that can be used to run an email server includes Novell Groupwise™, Lotus Notes™, Microsoft Exchange Servers™, Sendmail™, Postfix™, and Exim™. A web-based email platform, such as Gmail™, Hotmail™, or Yahoo! Mail™ can also be used. In the technology described herein, email servers hosted in network nodes 206, 208, 210 and 212 can use any of the platforms described. Users 214 can access their emails through many devices including in some examples the following devices: a smartphone, a personal computing (PC) device such as a desktop or laptop computer, a media center device or other PC derivative, portable media consumption device (mobile terminal, personal digital assistant (PDA), gaming and/or media console, etc.), a tablet computer, other consumer electronic device, or the like.

An email channel from an email server to an email client can be executed according to an email protocol like Internet Message Access Protocol IMAP, Post Office Protocol—Version 3 POP3 (other versions) and HTTP for web-based email interfaces. See, Crispin, "Internet Message Access Protocol—Version 4rev1", RFC 3501, March 2003; Myers, "Post Office Protocol—Version 3," RFC 1939, May 1996. An email channel between email servers acting as message transfer agents can be executed according to a protocol such as Simple Mail Transfer Protocol (SMTP). See, Klensin, J., "Simple Mail Transfer Protocol," RFC 5321, DOI 10.17487/RFC5321, October 2008, <http://www.rfc-editor.org/info/rfc5321>, which is incorporated herein by reference. Alternatives, such as proprietary email servers, can execute different protocols to carry emails on an email channel to an email recipient. In addition to protocols, email clients can access email servers via application programming interfaces (APIs).

The actual communication path through the internet can be point-to-point over public and/or private networks. The communications can occur over a variety of networks 218, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

The blockchain network 216 is a distributed and public ledger which maintains records of all the blockchain transactions on the blockchain. In some embodiments, the blockchain network is a peer-to-peer network and does not require a central authority or trusted intermediaries to authenticate or to settle the transactions or control the underlying infrastructure. Examples of popular blockchain platforms include Ethereum™, Eris™, Multichain™, Bitcoin™, Hyperledger Fabric™, and Hyperledger Corda™.

Users 214 can maintain a cryptocurrency balance and send or receive cryptocurrency through the external wallet service 220. Examples of popular wallets include Coinbase™, Bread Wallet™, Mycelium™, Exodus™, Copay™, Jaxx™ Armory™, Trezor™, Ledger Nano™, Green Address™, and Blockchain.Info™.

Figure 3:
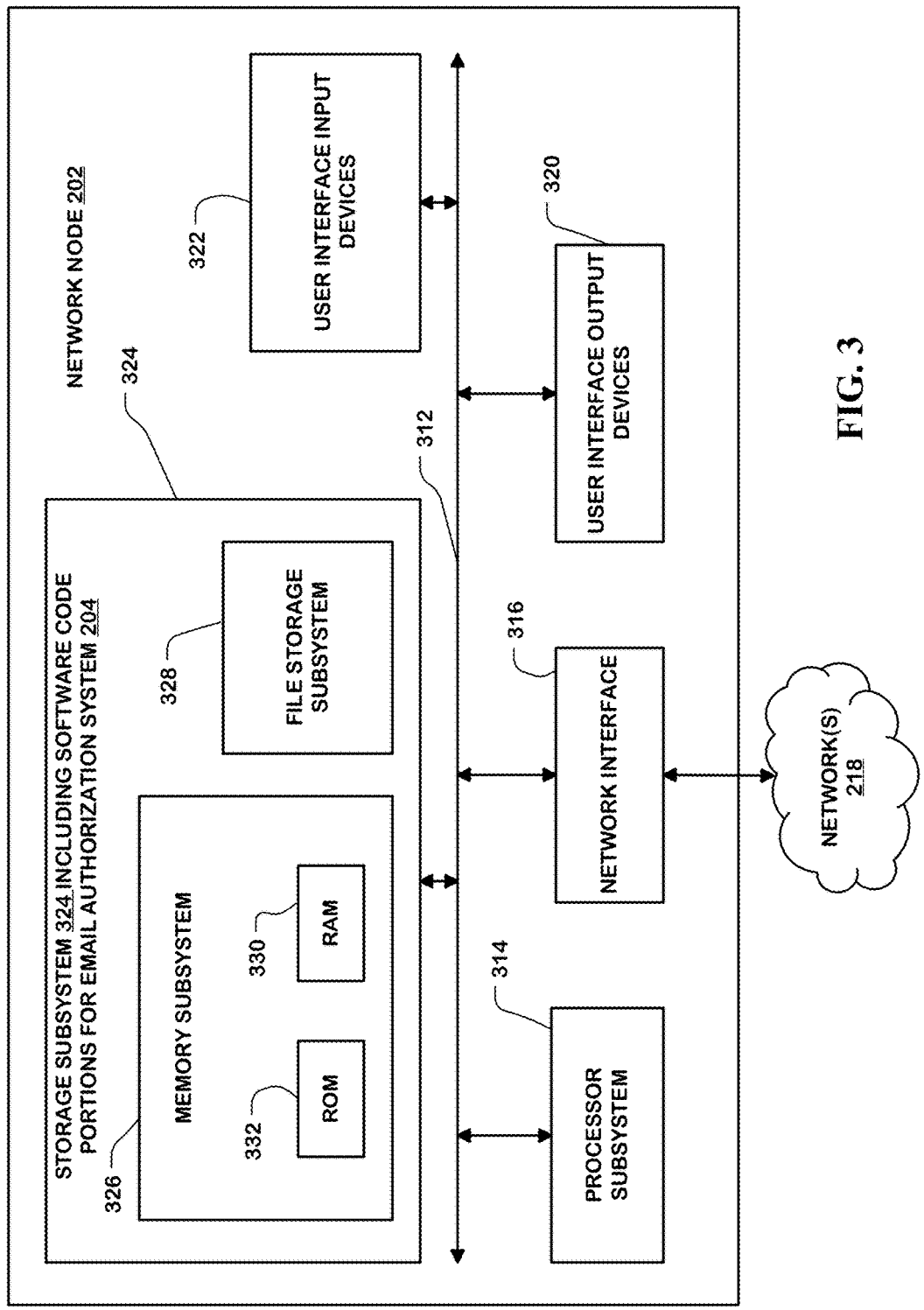
FIG. 3 is a simplified block diagram of a network node hosting an email authorization system.

The network node 202 hosts an email authorization system 204. FIG. 3 is a simplified block diagram of a network node that can be used to implement email authorization system 204. Network node 202 typically includes an operating system executed by a processor subsystem 314 which communicates with a number of peripheral devices via bus subsystem 312. These peripheral devices may include a storage subsystem 324, comprising a memory subsystem 326 and a file storage subsystem 328, user interface input devices 322, user interface output devices 320, and a network interface subsystem 316. The input and output devices allow user interaction with network node 202. Network interface subsystem 316 provides an interface to outside network 218 and is coupled via network 218 to other elements in system 200. The physical hardware components of network interfaces are sometimes referred to as network interface cards (NICs), although they need not be in the form of cards; for instance they could be in the form of integrated circuits (ICs) and connectors fitted directly onto a motherboard, or in the form of macrocells fabricated on a single integrated circuit chip with other components of the computer system.

User interface input devices 322 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into network node 202 or onto network 218.

User interface output devices 320 may include a display subsystem, a printer, a fax machine, or nonvisual displays such as audio output devices. The display subsystem may include a cathode ray tube (CRT), a flat-panel device such as a liquid crystal display (LCD), a projection device, or some other mechanism for creating a visible image. The display subsystem may also provide a nonvisual display such as via audio output devices. In general, use of the term "output device" is intended to include all possible types of devices and ways to output information from network node 202 to the user or to another machine or network node. In particular, an output device of the network node 202 on which email authorization system 204 is implemented, may include a visual output informing a user of action recommendations made by the system, or may include a communication device for communicating action signals.

Storage subsystem 324 stores the basic programming and data constructs that provide the functionality of certain embodiments of the present invention. For example, the various modules implementing the functionality of certain embodiments of the invention may be stored in storage subsystem 324. These software modules are generally executed by processor subsystem 314.

Memory subsystem 326 typically includes a number of memories including a main random access memory (RAM) 330 for storage of instructions and data during program execution and a read-only memory (ROM) 332 in which fixed instructions are stored. File storage subsystem 328 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer-readable medium such as one or more CD-ROMs, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed. The databases and modules implementing the functionality of certain embodiments of the invention may also be stored by file storage subsystem 328. The host memory subsystem 326 contains, among other things, computer instructions which, when executed by the processor subsystem 314, cause the computer system to operate or perform functions as described herein. As used herein, processes and software that are said to run in or on "the host", "the computer" or "the network", execute on the processor subsystem 314 in response to computer instructions and data in the host memory subsystem 326 including any other local or remote storage for such instructions and data.

Bus subsystem 312 provides a mechanism for letting the various components and subsystems of network node 202 communicate with each other as intended. Although bus subsystem 312 is shown schematically as a single bus, alternative embodiments of the bus subsystem may use multiple busses.

Network node 202 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of network node 202 depicted in FIG. 3 is intended only as a specific example for purposes of illustrating the preferred embodiments of the present invention. Many other configurations of network node 202 are possible having more or less components than the system depicted in FIG. 3.

In some embodiments, the email authorization system 204 can be implemented in the network node 202 as a Software-as-a-Service (SaaS) application, a web-architected application or a cloud-delivered service. Examples of common SaaS applications today include Salesforce.Com™, Box™, Dropbox™, Google Apps™ Amazon Web Services AWS™, Microsoft Office 365™, Workday™, Oracle on Demand™, Taleo™, Yammer™, and Concur™. SaaS applications provide functionalities to users that are implemented in the cloud, and that are the target of policies, e.g., logging in, editing user information, updating whitelists, deleting contacts from the contact list, in contrast to the offerings of simple websites and e-commerce sites. Note that a SaaS application can be supported by both web browser clients and application clients that use URL-based APIs (application programming interfaces).

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™ Truviso™, Amazon Elasticsearch Service™, Amazon Web Services™ (AWS), IBM Info-Sphere™, Borealis™, and Yahoo! S4™.

Email Authorization System

Figure 4:
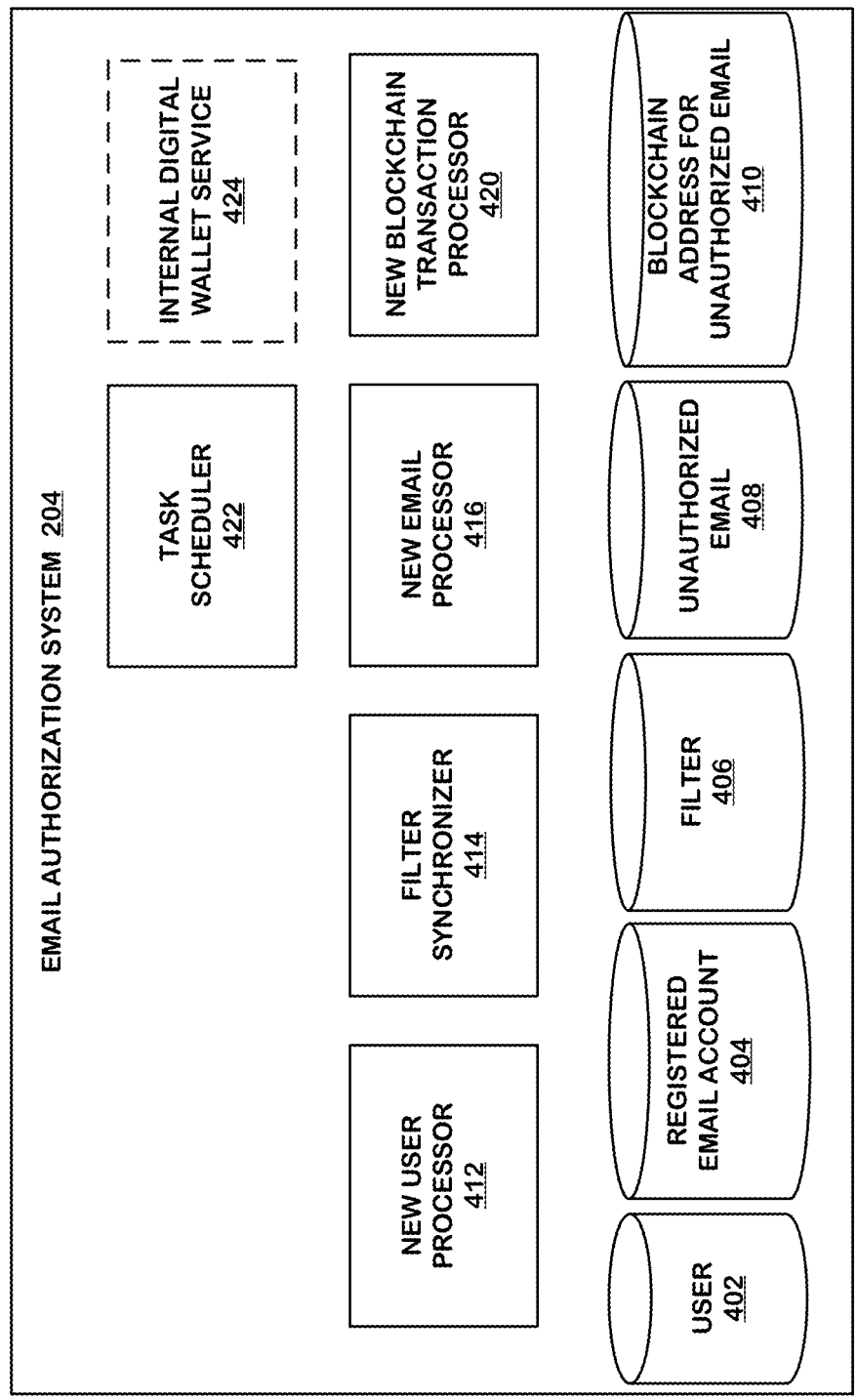
FIG. 4 illustrates an example of an email authorization system.

FIG. 4 illustrates an example of an email authorization system 204. The email authorization system 204 includes software components referred to herein as a new user processor 412, a filter synchronizer 414, a new email processor 416, a new blockchain transaction processor 420 and a task scheduler 422. These components can be distributed between nodes executing email servers and remote nodes in the network in some embodiments.

The new user processor 412 oversees the sign-up process for registration of new email authorization system users to identify and enable monitoring of email channels of registered recipients in the system. The filter synchronizer 414 maintains the filter used for classifying emails as unauthorized, such as by executing a routine that periodically checks for new contacts in user's contact list to be added to user's filter. The new email processor 416 periodically traverses email channels of registered recipients, and classifies new emails using a filter, creates blockchain addresses for each selected email, and causes the sending of a message to the senders of the selected emails prompting the senders to gain authorization for the selected emails by executing blockchain transactions. The new blockchain transaction processor 420 periodically checks for new blockchain transactions in the blockchain network 216, verifies that the blockchain transaction satisfies the requirements of the prompted transaction and identifies the selected emails as authorized, enabling for example, moving them to users' inboxes if the blocked transactions are verified. The task scheduler 422 schedules various tasks in the email authorization system 204, such as requesting the filter synchronizer 414 to check for new contacts in users' contact lists, requesting the new email processor 416 to check for new emails, and requesting the new blockchain transaction processor 420 to check for new blockchain transactions in the blockchain network 216. In some embodiments, the email authorization system 204 may also host an internal wallet service 424 for email authorization system users who wish to store their cryptocurrency balance using the email authorization system 204.

The email authorization system also includes a user database 402, a registered email account database 404, a filter database 406, an unauthorized email database 408 storing emails tagged as unauthorized, and a blockchain address for unauthorized email database 410. As used herein, the term "database" does not necessarily imply any unity of structure. For example, two or more separate databases, when considered together, still constitute a "database" as that term is used herein. Databases can include tables. In some embodiments, the user and registered email account data is stored in separate tables within a single database.

FIG. 5 is a symbolic drawing indicating how the user database 402 in FIG. 4 can be organized, according to an embodiment. The user database 402 contains information regarding the email authorization system users. The user database 402 includes a unique user ID 502 for each user, user's name 504, and a parameter (expected token) 506 specifying a characteristic of a blockchain transaction, such as a number or type of tokens or cryptocurrency value, which must be satisfied for authorization of the email for the recipient. In some embodiments, the user database 402 can have separate entries for the first name and surname of the user. As shown in FIG. 5, example of user entries include user John E. Murphy with user ID 1001 who expects 400 tokens to respond to an email from an unknown sender, user Kristine B. Odaniel with user ID 1004 who expects 100 tokens to respond to an email from an unknown sender, and user Carl N. Brewington with user ID 1005 who expects 2000 tokens to respond to an email from an unknown sender. In some embodiments, a characteristic such as an expected cryptocurrency value or token type or amount (expected token) 506 is set by the user. In some embodiments, the expected characteristic (expected token) 506 is a default set by the email authorization system. In some embodiments, the user database 402 can include the private keys of any external wallet service/internal wallet 508, e.g., John E. Murphy with user ID 1001 and Carl N. Brewington with user ID 1005. In some embodiments, the user database 402 may include other optional user information 510 that might be helpful for the functionality of the email authorization system 204, e.g., the password for the user account, the timestamp of last sign in, the timestamp for user account creation, user's organization, profile picture, and so on.

FIG. 6 is a symbolic drawing indicating how the registered email account database 404 in FIG. 4 may be organized, according to an embodiment. The registered email account database 404 contains information regarding the email accounts the email authorization system has permission to access for the purpose of executing the authorization service. The registered email accounts database 404 includes a unique email account ID 602 for each email account. The owner of the email account is identified by the owner's user ID 502. The registered email account database 404 further includes a registered email address 604 associated with the email account, and an email account type 606. The email account type 606 specifies the email platform used by the email server hosting the email account. Example email platforms include Novell Groupwise™, Lotus Notes™, Microsoft Exchange Servers™, Sendmail™, Postfix™, Exim™, Gmail™, Hotmail™, and Yahoo! Mail™. In some embodiments, a user, may have information for one registered email account, e.g., user Kristine B. Odaniel with user ID 1004 with one email account with email account ID 105 and email address daniel@toprecruiters.com on a Gmail™ email platform, and user Carl N. Brewington with user ID 1005 with one email account with email account ID 106 and email address CarlNBrewington@yahoo.com on a Yahoo! Mail™ email platform. In some embodiments, a user may have information for two or more registered email accounts, e.g., user John E. Murphy with user ID 1001 with one email account with email account ID 101 and email address JohnEMurphy@teleworm.us on a Outlook™ email platform, and one email account with email account ID 102 with email address JohnEMurphy@gmail on a Gmail™ email platform. In some embodiments, the user's email account might be hosted in an unconventional email platform; for such email accounts, Internet Message Access Protocol (IMAP) and SMTP URLs are stored. In some embodiments, the registered email account database 404 may further include other optional information 608 that might be helpful for the functionality of the email authorization system 204, e.g., last time contact list from the particular email account was synched with the user's filter, timestamp for account creation, last time account was updated and so on.

FIG. 7 is a symbolic drawing indicating how the filter database 406 in FIG. 4 may be organized, according to an embodiment. The filter database 406 contains information regarding a user's filter for each user in the email authorization system 204. A user's filter is composed using identifying parameters associated with emails. The identifying parameters can include components in an email message header, e.g., sender email address, email address domain, IP address from which the email originated, etc. In some embodiments, a user's filter can be composed of email addresses, domains already included in user's contact list in the user email account. Emails from the known contacts in the filter database 406 can be automatically forwarded to the users' email inboxes. The filter database 406 includes allowed email address 702 for a user identified by user ID 502. In some embodiments, a user may also include certain domains, e.g., user Kristine B. Odaniel with user ID 1004 allows any email from the domain yahoo.com. In some embodiments, any information in an email's message header can be included in a user's filter in the filter database 406. In some embodiments, the filter database 406 may further include other optional information 704 that might be helpful for the functionality of the email authorization system 204, e.g., timestamp for when the filter entry was created, timestamp for when the filter entry was last updated, whether the filtered member has been notified by email of inclusion in the user's filter and so on.

FIG. 8 is a symbolic drawing indicating how the unauthorized email database 408 in FIG. 4 is organized, according to an embodiment of the invention. The unauthorized email database 408 contains information regarding tagged, unauthorized emails from the users' registered email accounts. The unauthorized email database 408 identifies each unauthorized email with an email ID 802. The unauthorized email database 408 further includes the email subject 804, the email account ID 602 of the registered email account from which the email authorization system retrieved the email, the email sender's address 806, the current folder 808 in which the unauthorized email resides in the originating email server, and whether the blockchain transaction (token) has been received 810 and verified, that is required to release the blocked, unauthorized email. In some embodiments, blocked, unauthorized emails are kept in an "unauthorized" folder (alternatively labeled "unpaid" folder when the blockchain transaction includes a transfer of cryptocurrency) at the email server end. In some embodiments, the unauthorized email database 408 may further include other optional information 812 that might be helpful for the functionality of the email authorization system 204, e.g., timestamp for when the email entry was created, timestamp for when the email entry was last updated, whether the message prompting the sender to authenticate the email has been delivered, and so on. As shown in FIG. 8, spam emails such as the email with subject "GET PAID $500/hr" with email ID 1 and the email with subject "*FREE VACATION*" with email ID 3 are rarely authenticated by their senders, and the email authorization system 204 does not authorize their release to the recipients' email inbox. However, genuine cold emails such as the email with subject "Invitation to join ACM Artificial Intelligence Committee" with email ID 4 have been validated by the sender with email address "ProfDoLittle@cs.umn.edu," and the email authorization system 204 has authorized its release to the recipient's email inbox.

FIG. 9 is a symbolic drawing indicating how the blockchain address for unauthorized email database 410 in FIG. 4 is organized, according to an embodiment of the invention. The blockchain address for unauthorized email database 410 includes the email ID 802 for each unauthorized email, the email blockchain address 902 being created by the email authorization system 204, and whether a blockchain transaction with the corresponding blockchain address has been made 904. In some embodiments, the blockchain address for unauthorized email database 410 may further include other optional information 906 that might be helpful for the functionality of the email authorization system 204.

Signup Process for a New Email Authorization System User

Figure 10:
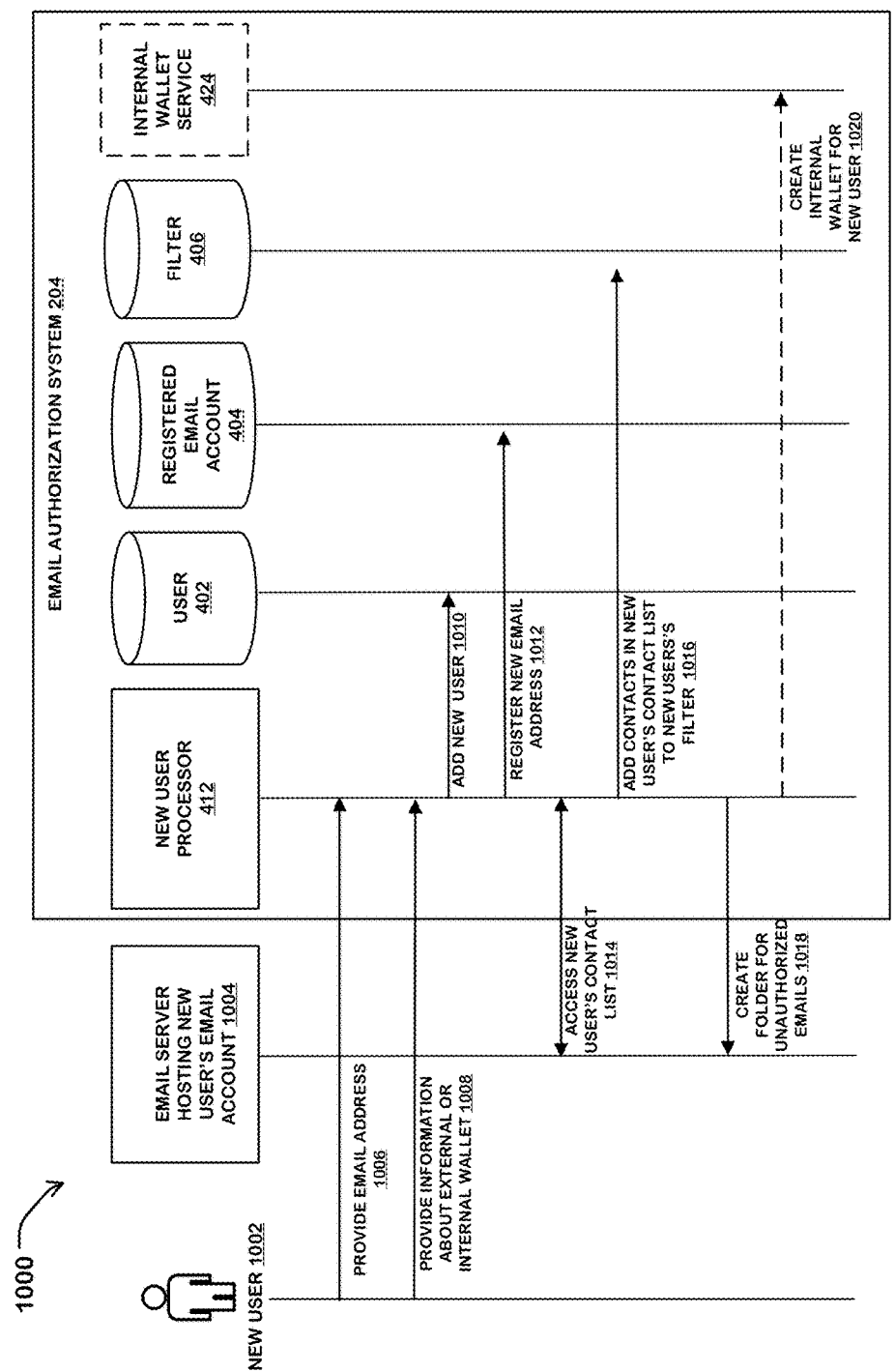
FIG. 10 is a sequence diagram illustrating a representative method of processing a new user in the email authorization system by the new user processor in FIG. 4.

FIG. 10 is an example workflow 1000 illustrating a representative method of processing a new user in the email authorization system 204 by the new user processor 412 in FIG. 4. In some embodiments, the actions in the workflow may be performed in different orders and with different, fewer or additional actions than those illustrated in FIG. 10. Multiple actions can be combined in some implementations.

FIG. 10 includes workflow 1000 that begins at step 1006, when a new user 1002 signs up by providing an email account and the email server information associated with the email account to the new user processor 412 in the email authorization system 204. In some embodiments, the email authorization system 204 will be able to detect the email server information automatically by the email address provided by the new user 1002. In some embodiments, the new user 1002 may provide information about more than one email account.

Workflow 1000 continues at step 1008 where the new user 1002 provides information about an external wallet to the new user processor 412 in the email authorization system 204, or the user might submit a request for an account in the email authorization system's internal wallet. At step 1010, the new user processor 412 adds the new user's 1002 information to the user database 402. At step 1012, the new user processor 412 adds the email account(s) information of the new user 1002 to the registered email account database 404. At step 1014, the new user processor 412 accesses the email server hosting the new user's email account 1004 for the new user's contact list. At step 1016, the new user processor 412 adds the contacts and domains in the new user's contact list to the user's filter in the filter database 406. The added filter database entries can be identified by the user ID of the new user. At step 1018, the new user processor 412 creates a folder for authorized emails in the new user's email account hosted in email server 1004. At step 1020, if requested by the new user 1002, the new user processor 412 creates an internal wallet account for the new user 1002 in the internal wallet service 424.

Filter Synchronization

Figure 11:
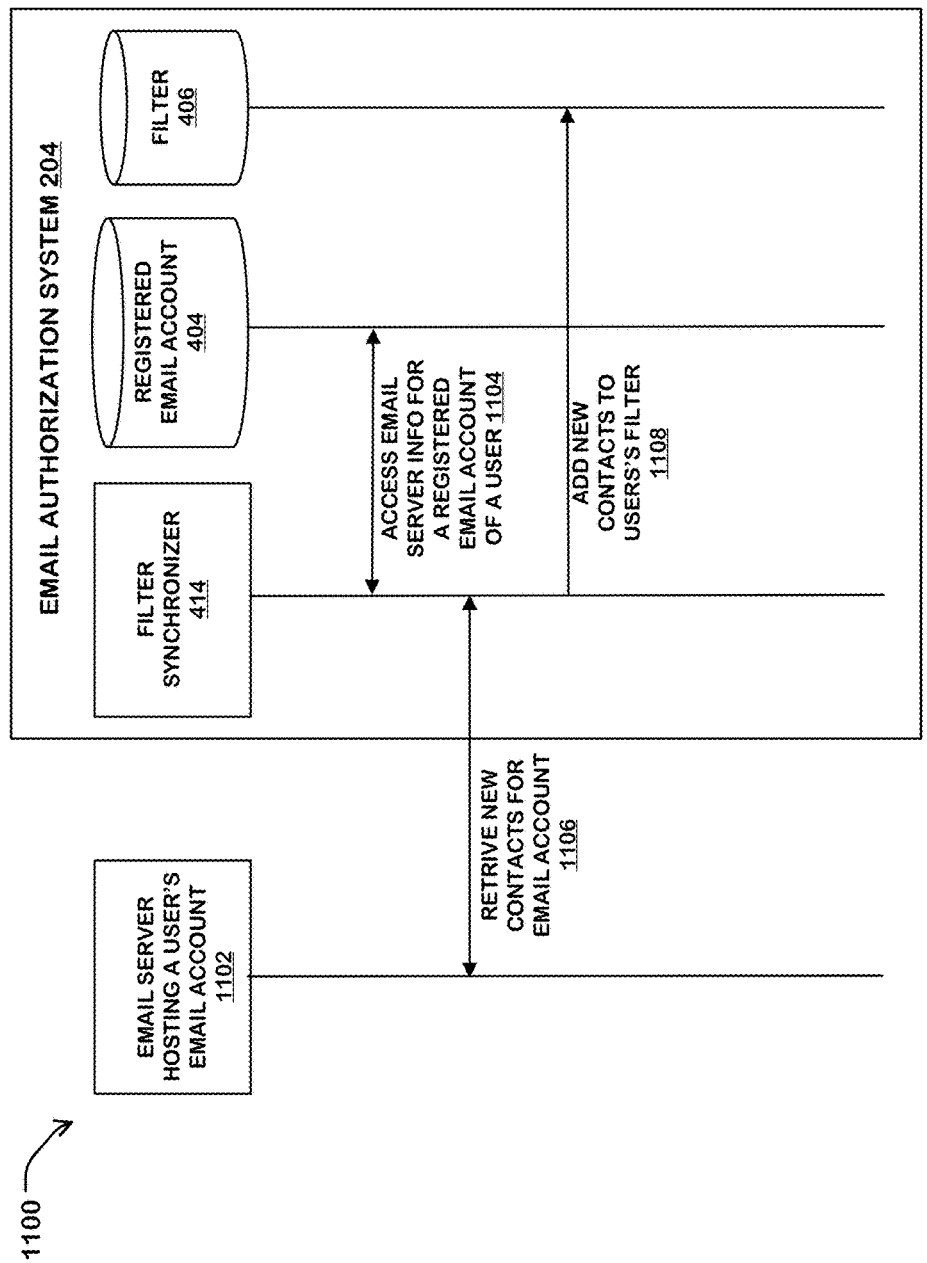
FIG. 11 is a sequence diagram illustrating a representative method of synching a user's filter with users' contact lists by the filter synchronizer in FIG. 4.

FIG. 11 is an example workflow 1100 illustrating a representative method of synching a user's filter in the filter database 406 with users' contact lists located in the user email account by the filter synchronizer 414 in FIG. 4. In some embodiments, the actions in the workflow may be performed in different orders and/or with different, fewer or additional actions than those illustrated in FIG. 11. Multiple actions can be combined in some implementations.

FIG. 11 includes workflow 1100 that begins at step 1104, the filter synchronizer 414 in the email authorization system 204 accesses the registered email account database 404 to access email account and server information for a registered user's email account in the registered email account database 404. Workflow 1100 continues at step 1106 where the filter synchronizer 414 retrieves information about new contacts from a user's contact list in the email server 1102 hosting the user's email account. At step 1108, the filter synchronizer 414 adds the newly retrieved contacts from the user's contact list to the user's filter in the filter database 406. The added entries in the filter database 406 can be identified by the user ID of the owner of the email account.

Processing of New Emails

Figure 12:
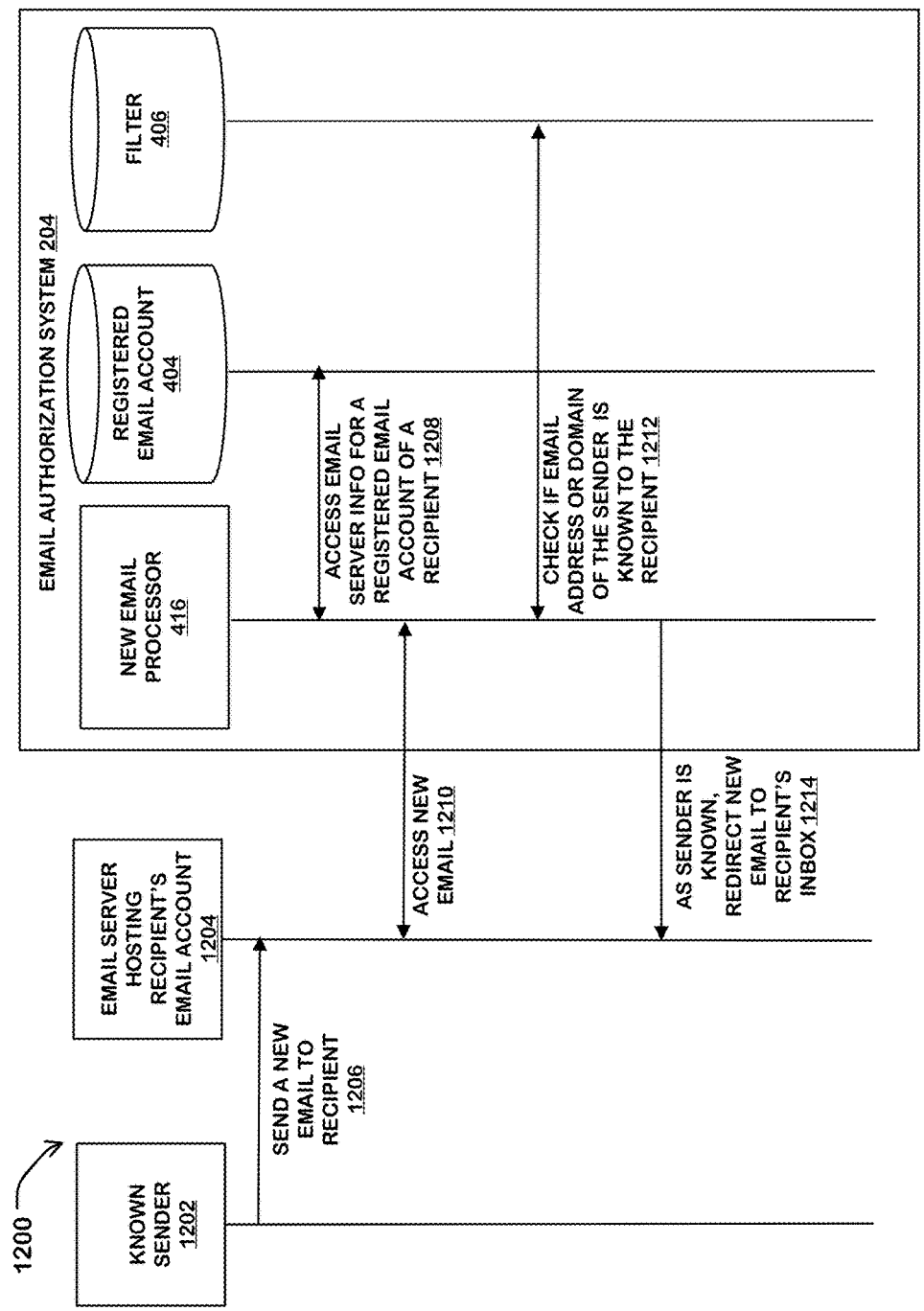
FIG. 12 is a sequence diagram illustrating a representative method of processing an email from a known sender by the new email processor in FIG. 4.

FIG. 12 is an example workflow 1200 illustrating a representative method of processing an email from a known sender by the new email processor 416 in the email authorization system 204. In some embodiments, the actions in the workflow may be performed in different orders and/or with different, fewer or additional actions than those illustrated in FIG. 12. Multiple actions can be combined in some implementations.

FIG. 12 includes workflow 1200 that begins at step 1206 when an email sender 1202 sends an email to a recipient. As used herein, a "recipient" is an email authorization system user, who has one or more email accounts registered with the system. The sender 1202 is known to the recipient as the sender's information is already included in the recipient's contact list and filter. The email is saved in a message folder, such as an inbox, for the recipient's email account in the email server 1204. Workflow 1200 continues at step 1208 where the new email processor 416 accesses recipient's email account information in the registered email account database 404. At step 1210, the new email processor 416 accesses the recipient's email account hosted by the email server 1204 with the email account information retrieved at step 1208. The email from the known sender 1202 from step 1206 is included among the new emails. At step 1212, the new email processor 416 applies the filter to the new emails in the email channel to check whether the known sender's email address or email address domain is listed in the recipient's filter stored in the filter database 406. As the sender's email address or email address domain is included in the filter database 406, the new email processor 416 in the email authorization system 204 can then redirect the email to the email inbox folder of the recipient's email account in the email server 1204 at step 1214.

Figure 13:
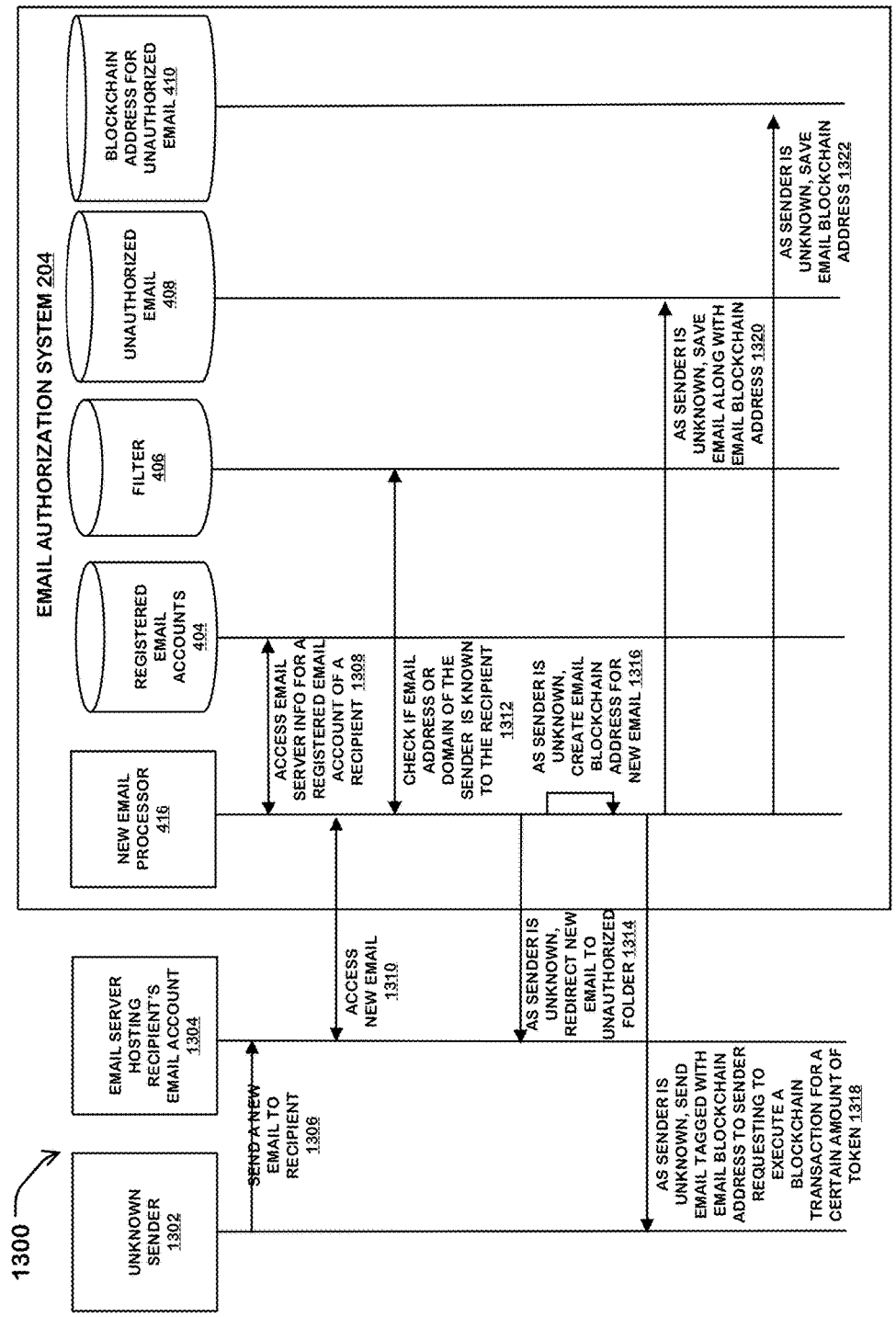
FIG. 13 is a sequence diagram illustrating a representative method of processing an email from an unknown sender by the new email processor in FIG. 4.

FIG. 13 is an example workflow 1300 illustrating a representative method of processing an email from an unknown sender (e.g., an email selected using the filter) by the new email processor 416 in the email authorization system 204. In some embodiments, the actions in the workflow may be performed in different orders and/or with different, fewer or additional actions than those illustrated in FIG. 13. Multiple actions can be combined in some implementations.

FIG. 13 includes workflow 1300 that begins at step 1306 when an unknown email sender 1302 sends an email to a recipient. The email is delivered to the email channel of the recipient email account, in which in some embodiments it is saved in a message folder for the recipient's email account in the email server 1304. Workflow 1300 continues at step 1308 when the new email processor 416 accesses recipient's email account information in the registered email account database 404. At step 1310, the new email processor 416 accesses the recipient email account hosted by the email server 1304 with the email account information retrieved at step 1308. The email from the unknown sender 1302 from step 1306 is included among the new emails. At step 1312, the new email processor 416 checks whether the sender's email address or email address domain is listed in the recipient's filter stored in the filter database 406. As the sender's email address or email address domain is not included in the filter database 406, the new email processor 416 in the email authorization system 204 classifies the email as unauthorized. The selected email classified as unauthorized is redirected in this example to an unauthorized email folder of the recipient's email account in the email server 1304 at step 1314. At step 1316, the new email processor 416 creates a new blockchain address for the email. At step 1318, the new email processor 416 sends, or causes the email server to send, an email or message tagged with the blockchain address created at step 1316 to unknown sender 1302 and prompts execution of a certain transaction having specified characteristics, such as an amount of cryptocurrency, to enable the tagged email to be authorized for the recipient. In some embodiments, the new email processor 416 causes the email or message to be sent from email server 1304 having the recipient's email addresses as a sender address. In another embodiment, the new email processor 416 causes the email or message to be sent to the unknown sender on behalf of the email authorization system 204. At step 1320, the new email processor 416 saves the email in the unauthorized email database 408. At step 1322, the new email processor 416 saves the blockchain address created at step 1316 in the blockchain address for unauthorized email database 410.

Figure 14:
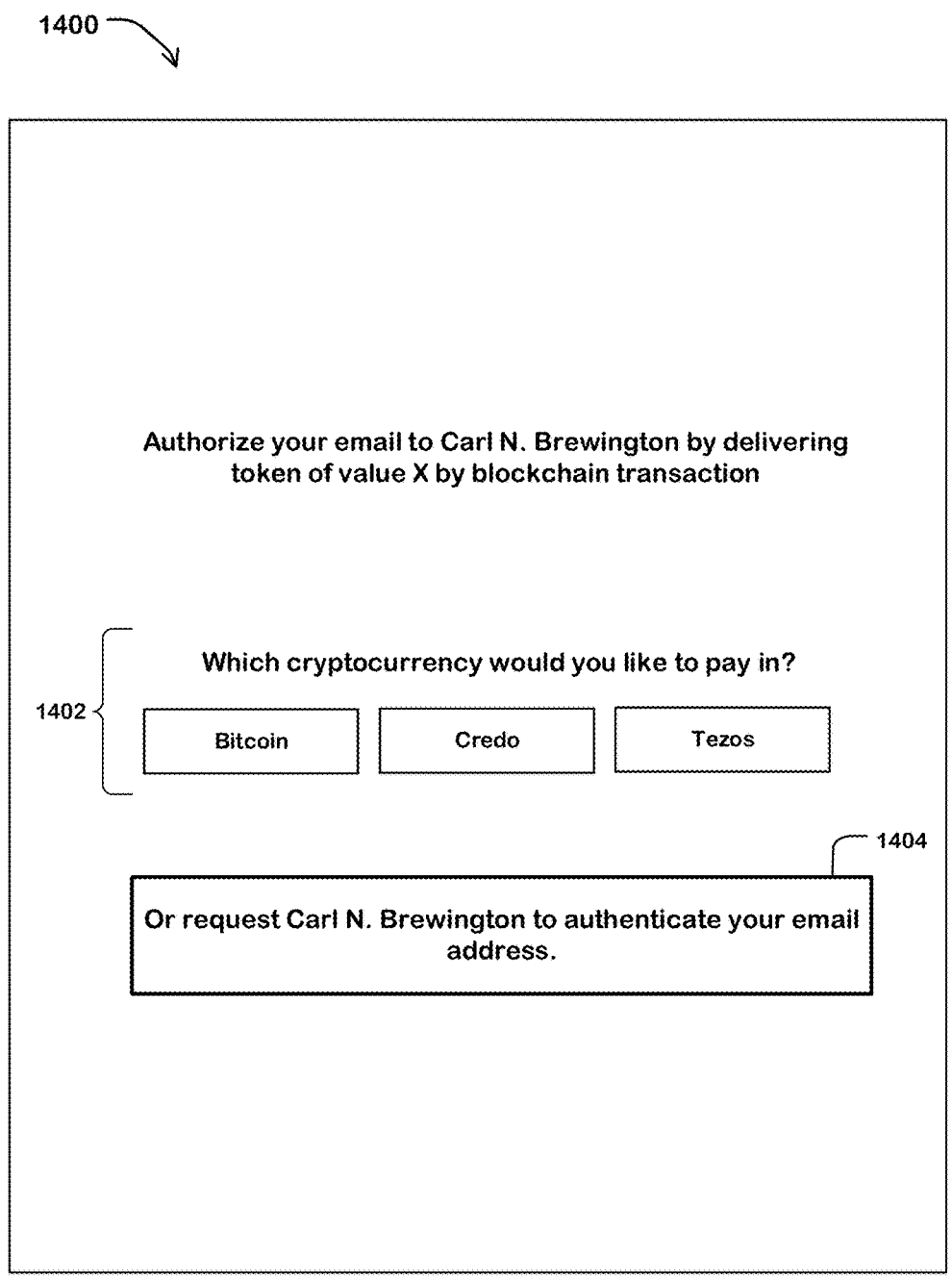
FIG. 14 illustrates an example message to an unknown sender prompting execution of a blockchain transaction in accordance with an implementation.

FIG. 14 illustrates an example message 1400 returned to the sender of tagged emails, prompting execution of a blockchain transaction in accordance with an implementation. The transaction can be prompted by text or icons in the email, with an associated link to tools, such as a web interface to a transaction composition engine, or a widget when selected causes initiation of code that composes the transaction or messages required to execute the transaction. The message 1400 prompts the unknown sender to validate the email by executing a blockchain transaction, such as transferring a certain number of tokens or amount of cryptocurrency to a blockchain address assigned to the tagged email, and logged by the email recipient. The prompts can include links to more than one type of blockchain transaction, such as transactions using available alternative types of cryptocurrencies 1402, reflected by tags in message 1400 in this example, and included in the illustrated example icons for Bitcoin™, Credo™, and Tezos™. The message carries an active link to tools that can execute the blockchain transaction, that is selected by selecting a chosen one of the types of cryptocurrency. Thus, characteristics of the blockchain transaction in this example include an amount of cryptocurrency of one of the available types shown in the message, and a value of the cryptocurrency. The message 1400 also carries the blockchain address, or a link to the blockchain address, created by the new email processor 416. The sender can opt to complete the blockchain transaction using the linked tools. The linked tools can enable the use of an internal or external wallet service. The blockchain transaction includes adding a record of the blockchain transaction into the blockchain ledgers in the blockchain network 216 with the tagged blockchain address.

The message also includes a link to a tool 1404 that causes sending of a request from the sender of the tagged email to the recipient, requesting that the sender's email account be added to the filter to enable delivery to the recipient without requiring execution of the blockchain transaction. In some embodiments, the request can be included in a blockchain transaction using the address of the tagged email. The authorization server can include a process for composing return emails linked to the individual blockchain addresses, and having the recipient email addresses identified as sender addresses in the return emails, as the messages are returned to senders.

Processing of New Blockchain Transactions

Figure 15:
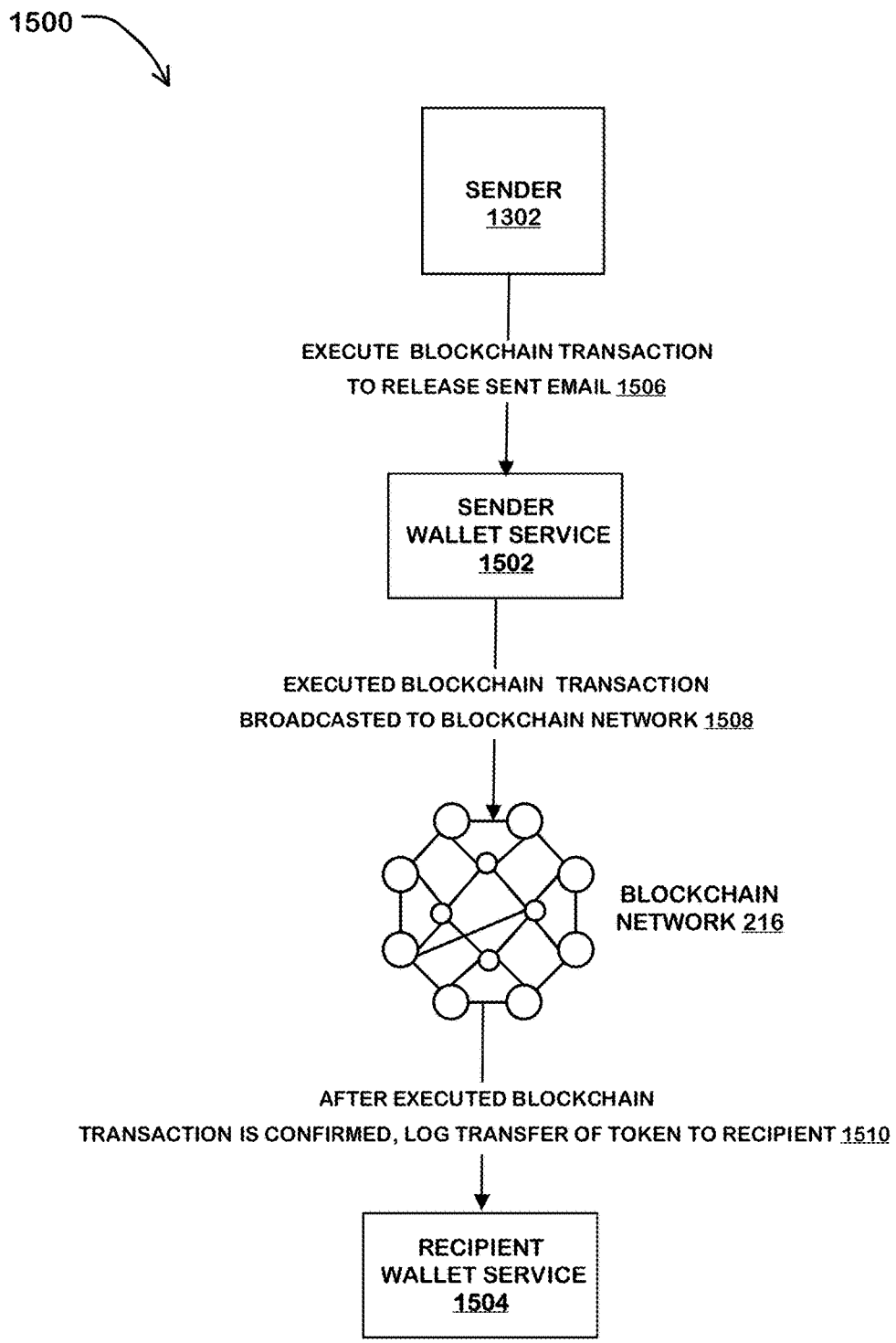
FIG. 15 illustrates a representative method of completing a blockchain transaction to authorize the release of an email.

FIG. 15 illustrates a representative method 1500 for the unknown sender 1302 to complete a blockchain transaction to authorize the release of the tagged email. At step 1506, the unknown sender 1302 completes the blockchain transaction through the sender wallet service 1502. In one embodiment, the unknown sender 1302 may use the service of an external wallet. In one embodiment, the unknown sender 1302 may be an email authorization system user and may use the internal wallet service 424 of the email authorization system 204. The sender wallet service 1502 broadcasts the blockchain transaction to the blockchain network 216 at step 1508. The blockchain transaction is entered into the blockchain ledgers in the blockchain network 216. After the blockchain transaction is verified in a blockchain network 216, the transfer of the cryptocurrency is logged in the recipient's wallet 1504 at step 1510. In one embodiment, the user may use the service of an external wallet. In one embodiment, the recipient may use the internal wallet service 424 of the email authorization system 204. For clarity sake, network(s) 218 is not included in FIG. 15.

Figure 16:
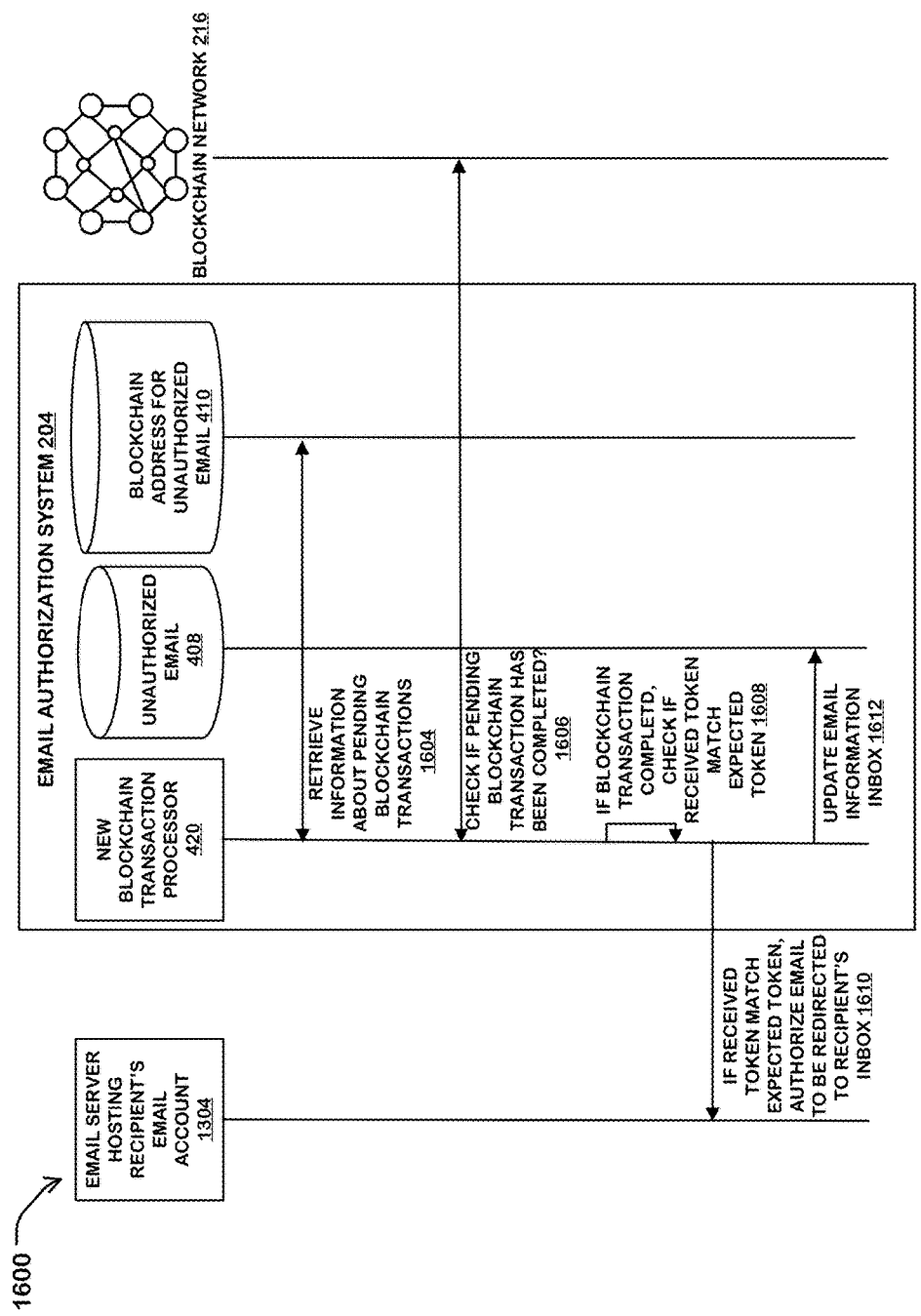
FIG. 16 is a sequence diagram illustrating a representative method of processing new blockchain transactions in the email authorization system by the new transaction processor in FIG. 4.

FIG. 16 is an example workflow 1600 illustrating a representative method of processing new blockchain transactions in the blockchain network 216 by the new blockchain transaction processor 420 in the email authorization system 204. In some embodiments, the actions in the workflow may be performed in different orders and/or with different, fewer or additional actions than those illustrated in FIG. 16. Multiple actions can be combined in some implementations.

FIG. 16 includes workflow 1600 that begins at step 1604, when the new blockchain transaction processor 420 retrieves information about pending blockchain transactions from the blockchain address for unauthorized email database 410, including blockchain addresses of the pending transactions. The Workflow 1600 continues at step 1606 where the new blockchain transaction processor 420 checks the blockchain ledgers in the blockchain network 216 to determine whether any pending blockchain transaction has been completed against the retrieved blockchain addresses in unauthorized email database 410. At step 1608, if a pending transaction has been completed, the blockchain transaction processor 420 checks if the token is received, or other characteristics required, from the completed blockchain transaction matching the expected token of the email recipient. At step 1610, if the token received from the completed blockchain transaction matches the expected token, the new blockchain transaction processor 420 marks the email as authorized. The email server can then transfer the authorized email to a designated message folder such as the recipient's primary email inbox in the recipient's email account in email server 1304. At step 1612, the new blockchain transaction processor 420 updates the information for the authorized email in the unauthorized email database 408 to specify that the blockchain transaction has been completed and the email has been released.

In some embodiments, the new blockchain transaction processor 420 may get a notification from the unknown sender's wallet service or the recipient's wallet service that a blockchain transaction has been completed. In such cases, the blockchain transaction processor 420 may check if the token received from the completed blockchain transaction matches the expected token of the email recipient. If the token received, or other characteristics required, from the completed blockchain transaction matches the expected characteristic, the new blockchain transaction processor 420 marks the email as authorized, and the authorized email can be moved from the unauthorized folder to the recipient's email inbox in the recipient's email account.

Email Authorization System Scheduler

Figure 17:
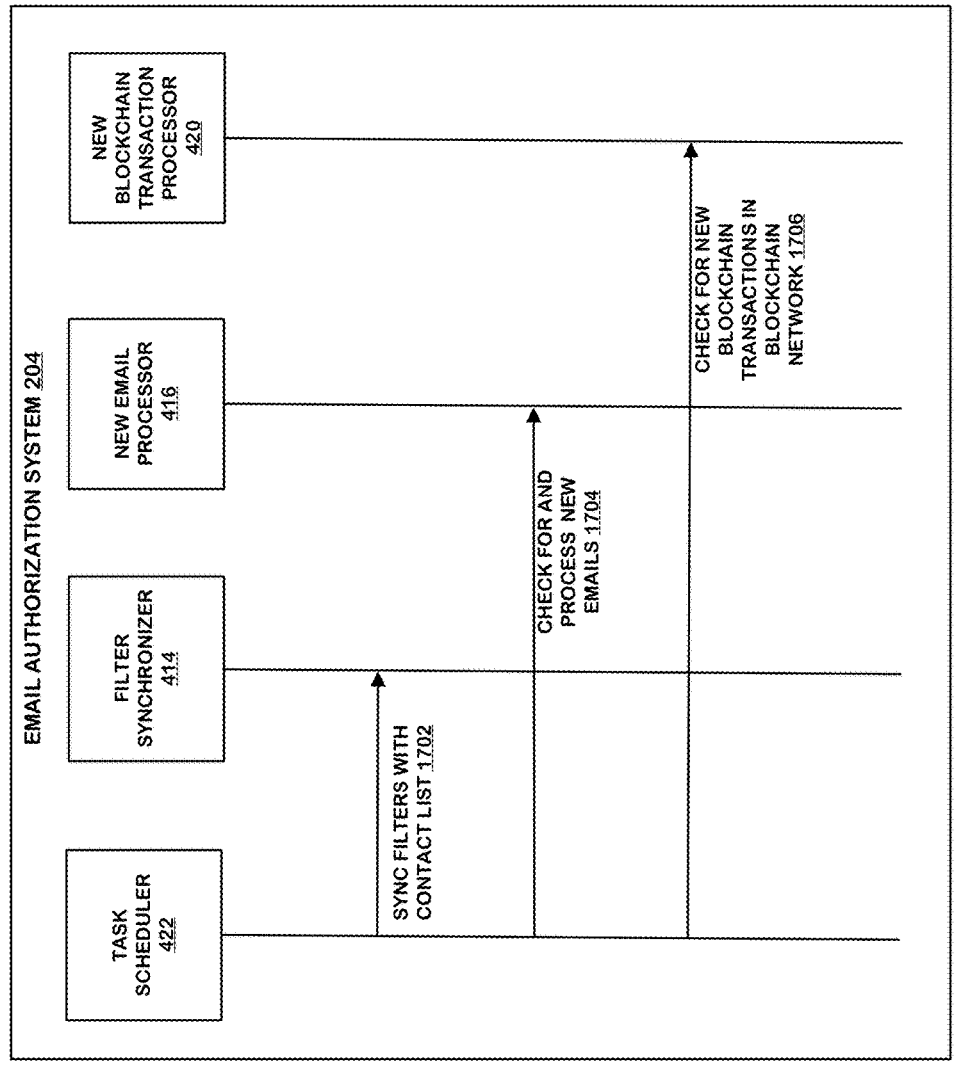
FIG. 17 is a sequence diagram illustrating a representative method of scheduling various tasks in the email authorization system by the task scheduler in FIG. 4.

FIG. 17 is an example workflow 1700 illustrating a representative method of scheduling various tasks by the task scheduler 422 in the email authorization system 204. In some embodiments, the actions in the workflow may be performed in different orders and/or with different, fewer or additional actions than those illustrated in FIG. 17. Multiple actions can be combined in some implementations.

In the workflow 1700, the task scheduler 422 schedules various tasks in the email authorization system 204, such as requesting the filter synchronizer 414 update the filter of each email authorization system user by checking for new contacts in user's contact list maintained in user's email account (step 1702), requesting the new email processor 416 to check for new emails in each email authorization system user's email account (step 1704), and requesting the new blockchain transaction processor 420 to check for new blockchain transactions in the blockchain network 216 (step 1706). In some embodiments, the task scheduler 422 will request the filter synchronizer 414 to sync user's filter every six hours. In some embodiments, the task scheduler 422 will request the new email processor 416 to check for new emails every fifteen minutes. In some embodiments, the task scheduler 422 will request the new blockchain transaction processor 420 to check for new blockchain transactions in the blockchain network 216 every fifteen minutes.

Blockchain Transaction Block

Figure 18A:
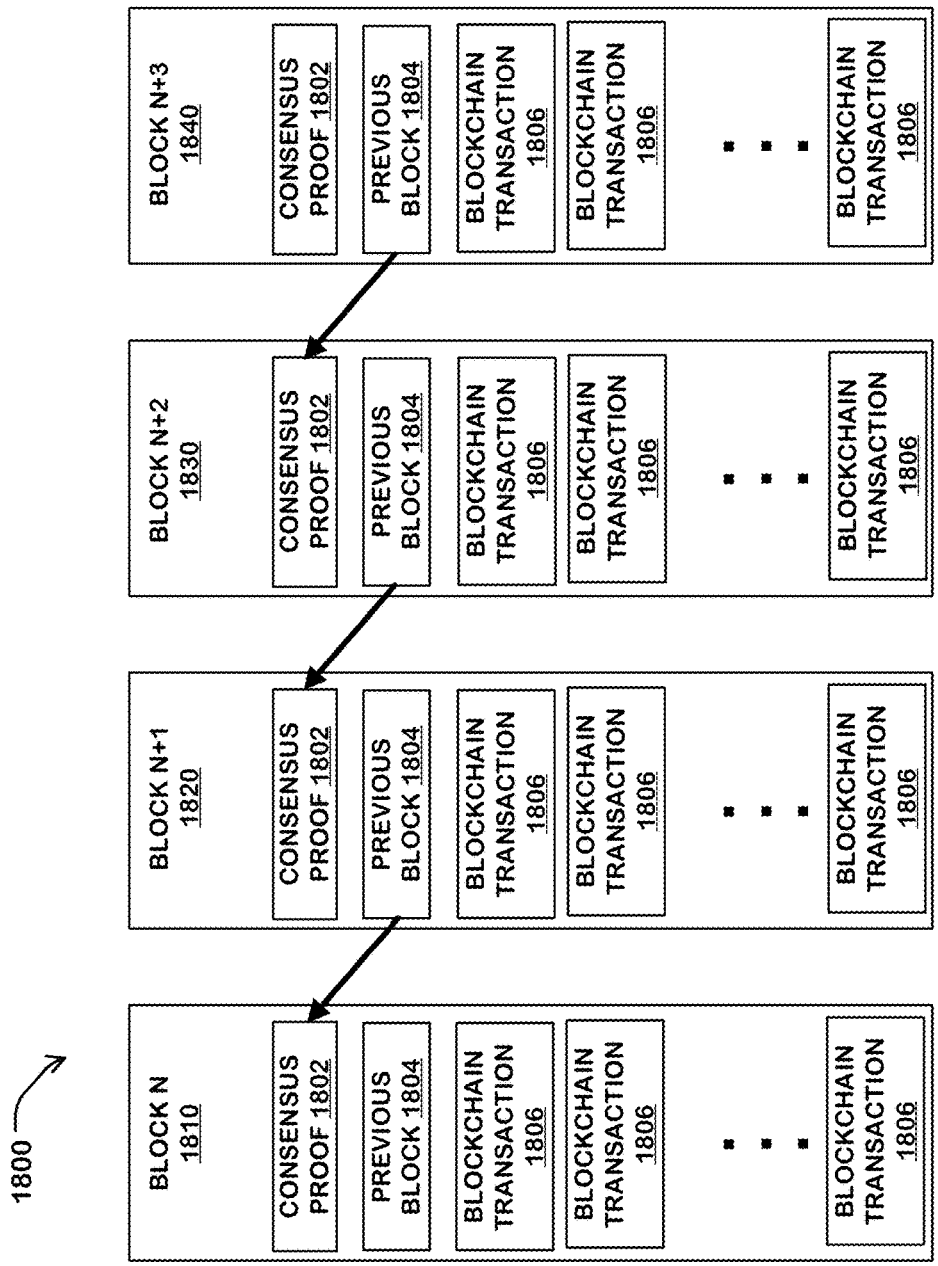

Blockchain network 216 is maintained by a network of nodes where every node executes and records the same blockchain transactions. Each node in the blockchain network 216 includes a one or more distributed blockchain ledger data structure comprising a chain of blocks or "blockchain." This blockchain ledger data structure is replicated among the nodes in the blockchain network 216. FIG. 18A illustrates a segment of such a blockchain ledger data structure 1800, consisting of blocks 1810, 1820, 1830 and 1840. For the sake of clarity, only four blocks are included in FIG. 18A. Any number of blocks can be present in a blockchain structure.

Blockchain transactions 1806 are time-stamped and bundled into blocks where each block is identified by its cryptographic hash called the consensus proof 1802. The consensus proof can be determined by a consensus algorithm. Consensus algorithms that can be used for techniques described herein are the proof-of-stake algorithm (PoS), the practical Byzantine fault tolerance algorithm (PBFT), the proof-of-work algorithm (PoW), the delegated proof-of-stake algorithm (DPoS), the proof-of-authority algorithm (PoA) and the proof-of-importance algorithm (PoI). One skilled in the art would appreciate that, in other implementations, the consensus proof can be determined by any consensus algorithm.

The blocks 1810, 1820, 1830, 1840 form a sequence where each block references the consensus proof of the previous or parent block 1804, forming a chain of blocks. In some embodiments, a special data structure called a Merkle tree is used to store the blockchain transactions.

New blocks can be created and added to the blockchain in a process called mining. The nodes in the blockchain network 216 that perform the mining operations are called miners or stakers. New blockchain transactions are broadcast to all the nodes on the network. Each miner node creates its own block by collecting the new blockchain transactions and then finds a consensus proof for its block by performing complex cryptographic computations. The miners validate the blockchain transactions and reach a consensus on the block that should be added next to the blockchain. The newly mined block, called the winning block, is then broadcast to the entire network.

Blockchain is an immutable and durable data structure which maintains a record of the blockchain transactions that are tamper-resistant. Once a blockchain transaction is recorded in a block, it cannot be altered or deleted as long as a majority of the computational power of the network is not controlled by peers who collude to alter the blockchain.

While each miner on the blockchain network 216 can create its own block, only the block which has a consensus proof of a given difficulty is accepted to be added to the blockchain. The consensus mechanism ensures that all the nodes agree on the same block to contain the canonical blockchain transactions. Blockchain offers enhanced security as compared to centralized systems as every transaction is verified by multiple miners. The integrity of the transaction data recorded in the blocks is protected through strong cryptography. In addition to the transaction data, each block contains a consensus proof of itself and the consensus proof of the previous block. Any attempts to modify a transaction would result in a change in the consensus proof and would require all the subsequent blocks to be recomputed. This would be extremely difficult to achieve as long as the majority of miners do not cooperate to attack the network.

FIG. 18B illustrates an example blockchain transaction block 1850 located in block 1810 that implements the technology disclosed. The blockchain transaction block 1850 includes a the blockchain address 1852 associated with the blockchain transaction, a timestamp 1854 to record the time and date the blockchain transaction was completed, and the amount of token received 1856. The example blockchain transaction block 1850 records the blockchain transaction to authenticate the email with email ID 4 in the unauthorized email database 408. The blockchain transaction block 1850 can also include other components which are not shown in FIG. 18B, such as header, nonce, balance, storage root, code hash, value, signature, ommers hash, beneficiary, state root, transactions root, receipts root, logs bloom, difficulty, number, private key, public key, extra data, and mix hash. One skilled in the art would appreciate that, in other implementations, the blockchain transaction block 1850 shown in FIG. 18B can be distributed across multiple blockchain ledgers in blockchain nodes in the blockchain network 216.

A number of workflows illustrating logic are described herein. The logic can be implemented using processors programmed using computer programs stored in memory accessible to the computer systems and executable by the processors. With all workflows herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a re-arrangement of steps will achieve the same results only if certain conditions are satisfied. Furthermore, it will be appreciated that the workflows herein show only steps that are pertinent to an understanding of the invention, and it will be understood that numerous additional steps for accomplishing other functions can be performed before, after and between those shown.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing descriptions, it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for handling email with blockchain based procedures, comprising:
    filtering incoming emails being addressed to particular recipient email addresses to identify selected emails using filters for registered email accounts;
    establishing individual blockchain addresses for the selected emails, sending messages to senders of the selected emails and prompting execution of blockchain transactions in a blockchain network based on the individual blockchain addresses, wherein the prompted blockchain transactions include transferring tokens having specified characteristics required for authorization of the selected emails; and
    authorizing the selected emails with the particular recipients email addresses upon (i) detection of a transaction in the blockchain network of the prompted blockchain transactions, and (ii) verification of the specified characteristics of the prompted blockchain transactions in the blockchain network.

2. The method of claim 1, including tagging the selected emails in memory as unauthorized, pending the authorizing.

3. The method of claim 1, including moving the authorized selected emails to email inbox folders of the recipients.

4. The method of claim 1, wherein said filtering includes traversing email inbox folders of the registered email accounts, removing the selected emails from the email inbox folders, and saving the selected emails in a folder or folders for unauthorized emails for the registered email accounts.

5. The method of claim 1, wherein said filtering includes applying the filters to emails in email channels of the registered email accounts.

6. The method of claim 1, including maintaining a list of registered email accounts, further including maintaining in memory lists of individual blockchain addresses and associated encryption keys for the selected emails of the registered email accounts.

7. The method of claim 1, including composing return emails linked to the individual blockchain addresses, and having the recipient email addresses identified as sender addresses in the return emails, as the messages are returned to senders.

8. The method of claim 1, wherein a message returned associated with a selected email includes a link to a user interface for tools useable to cause execution of the prompted blockchain transaction required for authorization of the selected email.

9. The method of claim 1, wherein the prompted blockchain transaction comprises a transfer of cryptocurrency having a specified monetary value.

10. The method of claim 1, including monitoring the blockchain for transactions addressed to the individual blockchain addresses generated for the selected emails.

11. The method of claim 1, including responding to notifications indicating presence on the blockchain network of blockchain transactions to determine whether transactions addressed to the individual blockchain addresses generated for the selected emails have been executed.

12. The method of claim 1, including maintaining a list of registered email accounts, and composing filters for each registered email account in the list of registered email accounts that include information identifying parameters associated with emails.

13. A system for managing email with blockchain based procedures, comprising:
one or more network nodes, where a network node of the one or more network nodes includes a communication interface, a hardware processor or hardware processors and memory accessible by the hardware processor or hardware processors;
the one or more network nodes configured for execution of a procedure for handling emails, comprising:
filtering incoming emails being addressed to particular recipient email addresses to identify selected emails using filters for registered email accounts;
establishing individual blockchain addresses for the selected emails, sending messages to senders of the selected emails and prompting execution of blockchain transactions in a blockchain network based on the individual blockchain addresses, wherein the prompted blockchain transactions include transferring tokens having specified characteristics required for authorization of the selected emails; and
authorizing the selected emails with the particular recipients email addresses upon (i) detection of a transaction in the blockchain network of the prompted blockchain transactions, and (ii) verification of the specified characteristics of the prompted blockchain transactions in the blockchain network.

14. The system of claim 13, the procedure for handling emails including tagging the selected emails in memory as unauthorized, pending the authorizing.

15. The system of claim 13, the procedure for handling emails including moving the authorized selected emails to email inbox folders of the recipients.

16. The system of claim 13, the procedure for handling emails wherein said filtering includes traversing email inbox folders of the registered email accounts, removing the selected emails from the email inbox folders, and saving the selected emails in a folder or folders for unauthorized emails for the registered email accounts.

17. The system of claim 13, wherein said filtering includes applying the filters to emails in email channels of the registered email accounts.

18. The system of claim 13, the procedure for handling emails including maintaining a list of registered email accounts, further including maintaining in memory lists of individual blockchain addresses and associated encryption keys for the selected emails of the registered email accounts.

19. The system of claim 13, the procedure for handling emails including composing return emails linked to the individual blockchain addresses, and having the recipient email addresses identified as sender addresses in the return emails, as the messages are returned to senders.

20. The system of claim 13, wherein a message returned associated with a selected email includes a link to tools useable to cause execution of the prompted blockchain transaction required for authorization of the selected email.

21. The system of claim 13, wherein the prompted blockchain transaction comprises a transfer of cryptocurrency having a specified monetary value.

22. The system of claim 13, the procedure for handling emails including monitoring the blockchain for transactions addressed to the individual blockchain addresses generated for the selected emails.

23. The system of claim 13, the procedure for handling emails including responding to notifications indicating presence on the blockchain network of blockchain transactions to determine whether transactions addressed to the individual blockchain addresses generated for the selected emails have been executed.

24. The system of claim 13, the procedure for handling emails including maintaining a list of registered email accounts, and composing filters for each of the registered email account in the list of registered email accounts that include information identifying parameters associated with emails.

25. A computer program product embodied in non-transitory machine readable memory having a computer program stored in the memory, the computer program including instructions configured for execution of a procedure for handling emails with blockchain based procedures, comprising:
filtering incoming emails being addressed to particular recipient email addresses to identify selected emails using filters for registered email accounts;
establishing individual blockchain addresses for the selected emails, sending messages to senders of the selected emails and prompting execution of blockchain transactions in a blockchain network based on the individual blockchain addresses, wherein the prompted blockchain transactions include transferring tokens having specified characteristics required for authorization of the selected emails; and
authorizing the selected emails with the particular recipients email addresses upon (i) detection of a transaction in the blockchain network of the prompted blockchain transactions, and (ii) verification of the specified characteristics of the prompted blockchain transactions in the blockchain network.

26. The computer program product of claim 25, the procedure for handling emails including tagging the selected emails in memory as unauthorized, pending the authorizing.

27. The computer program product of claim 25, the procedure for handling emails including moving the authorized selected emails to email inbox folders of the recipients.

28. The computer program product of claim 25, wherein said filtering includes traversing email inbox folders of the registered email accounts, removing the selected emails from the email inbox folders, and saving the selected emails in a folder or folders for unauthorized emails for the registered email accounts.

29. The computer program product of claim 25, wherein said filtering includes applying the filters to emails in email channels of the registered email accounts.

30. The computer program product of claim 25, the procedure for handling emails including maintaining a list of registered email accounts, further including maintaining in memory lists of individual blockchain addresses and associated encryption keys for the selected emails of the registered email accounts.

31. The computer program product of claim 25, the procedure for handling emails including composing return emails linked to the individual blockchain addresses, and having the recipient email addresses identified as sender addresses in the return emails, as the messages are returned to senders.

32. The computer program product of claim 25, wherein a message returned associated with a selected email includes a link to tools useable to cause execution of the prompted blockchain transaction required for authorization of the selected email.

33. The computer program product of claim 25, wherein the prompted blockchain transaction comprises a transfer of cryptocurrency having a specified monetary value.

34. The computer program product of claim 25, the procedure for handling emails including monitoring the blockchain for transactions addressed to the individual blockchain addresses generated for the selected emails.

35. The computer program product of claim 25, the procedure for handling emails including responding to notifications indicating presence on the blockchain network of blockchain transactions to determine whether transactions addressed to the individual blockchain addresses generated for the selected emails have been executed.

36. The computer program product of claim 25, the procedure for handling emails including maintaining a list of registered email accounts, and composing filters for each of the registered email account in the list of registered email accounts that include information identifying parameters associated with emails.

\* \* \* \* \*